US012183086B2

(12) United States Patent
Sakai et al.

(10) Patent No.: US 12,183,086 B2
(45) Date of Patent: Dec. 31, 2024

(54) ON-VEHICLE RECORDING APPARATUS, ON-VEHICLE RECORDING CONTROL METHOD, AND MEDUIM

(71) Applicant: JVCKENWOOD Corporation, Yokohama (JP)

(72) Inventors: Yasutoshi Sakai, Yokohama (JP); Keita Hayashi, Yokohama (JP); Hirofumi Taniyama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 78 days.

(21) Appl. No.: 18/076,431

(22) Filed: Dec. 7, 2022

(65) Prior Publication Data

US 2023/0107465 A1    Apr. 6, 2023

Related U.S. Application Data

(63) Continuation of application No. PCT/JP2021/005363, filed on Feb. 12, 2021.

(30) Foreign Application Priority Data

Jun. 19, 2020  (JP) ................................ 2020-106238
Sep. 24, 2020  (JP) ................................ 2020-160168

(51) Int. Cl.
*G06V 20/56* (2022.01)
*G06V 20/40* (2022.01)

(52) U.S. Cl.
CPC .............. *G06V 20/56* (2022.01); *G06V 20/44* (2022.01)

(58) Field of Classification Search
None
See application file for complete search history.

(56) References Cited

U.S. PATENT DOCUMENTS

| 10,275,366 | B2* | 4/2019 | Pandy | G07C 5/02 |
|---|---|---|---|---|
| 10,949,553 | B1* | 3/2021 | Kowalick | G06F 21/44 |
| 2017/0140166 | A1 | 5/2017 | Koseki | |
| 2017/0223057 | A1* | 8/2017 | Amiri | H04L 67/306 |
| 2019/0082099 | A1* | 3/2019 | Imomoto | H04N 23/61 |

(Continued)

FOREIGN PATENT DOCUMENTS

| JP | 2004-192277 | 7/2004 |
|---|---|---|
| JP | 2011-151460 | 8/2011 |

(Continued)

OTHER PUBLICATIONS

International Search Report and Written Opinion for International Application No. PCT/JP2021/005363 mailed on Apr. 20, 2021, 8 pages.

*Primary Examiner* — Chikaodili E Anyikire
(74) *Attorney, Agent, or Firm* — Amin, Turocy & Watson, LLP

(57) ABSTRACT

An on-vehicle recording apparatus includes a captured image data acquiring unit that acquires captured image data of surroundings of a vehicle; an event detecting unit that detects an event occurred with respect to the vehicle; a recording control unit that stores the captured image data as normal recording data that is not based on the event and as event recording data that is based on the event; a communication control unit that establishes a connection with a communication terminal; and an access control unit.

7 Claims, 13 Drawing Sheets

(56) References Cited

U.S. PATENT DOCUMENTS

| | | | | |
|---|---|---|---|---|
| 2019/0349651 A1* | 11/2019 | Sano | .................... | G06F 16/901 |
| 2020/0327225 A1* | 10/2020 | Nguyen | ................ | G06N 3/084 |
| 2021/0234849 A1* | 7/2021 | Lamb | .................... | H04L 63/04 |
| 2022/0114845 A1* | 4/2022 | Ryu | ....................... | G06F 21/60 |
| 2023/0306130 A1* | 9/2023 | Sasaki | ................... | G06F 21/62 |

FOREIGN PATENT DOCUMENTS

| | | |
|---|---|---|
| JP | 2017-091421 | 5/2017 |
| JP | 2017-220065 | 12/2017 |
| WO | 2018/138983 | 8/2018 |

\* cited by examiner

ON-VEHICLE RECORDING APPARATUS, ON-VEHICLE RECORDING CONTROL METHOD, AND MEDUIM

CROSS-REFERENCE TO RELATED APPLICATION(S)

This application is a Continuation of PCT international application Ser. No. PCT/JP2021/005363 filed on Feb. 12, 2021 which designates the United States, incorporated herein by reference, and which claims the benefit of priority from Japanese Patent Application No. 2020-106238, filed on Jun. 19, 2020 and Japanese Patent Application No. 2020-160168, filed on Sep. 24, 2020, both of which incorporated herein by reference.

BACKGROUND

1. Technical Field

The present invention relates to an on-vehicle recording apparatus, an on-vehicle recording control method, and a medium.

2. Description of the Related Art

A dashboard camera that is installed in a vehicle and that captures an image of the surroundings of the vehicle is often installed in the vicinity of a front window or a rear window of the vehicle, so that some dashboard camera does not include a display screen in terms of acquiring visibility of a passenger of the vehicle. Furthermore, some dashboard camera that does not include the display screen allows a mobile terminal to refer to information acquired by the dashboard camera by performing communication between the dashboard camera and the mobile terminal that has been registered in advance by a user. For example, in Japanese Laid-open Patent Publication No. 2011-151460, in the case where an event, such as a collision, has been detected by an on-vehicle detecting device, information on the event is able to be transmitted to the mobile terminal by using wireless communication and checked by the mobile terminal.

However, in some cases, in the case where an event, such as a collision of the vehicle has occurred, the mobile terminal that performs communication with the dashboard camera is a mobile terminal owned by a driver of the vehicle, it may be difficult to check the state of the event by using the mobile terminal owned by the driver depending on a condition of the driver due to the occurred event.

However, in the case where communication between the dashboard camera and a device, such as a mobile terminal, that has been registered in advance is allowed to be performed without limitation, information other than information on the event is also able to be checked by an external device, so that there may be a case in which privacy of the user may be invaded.

SUMMARY

In order to solve the above problem and achieve the above object, an on-vehicle recording apparatus according to an embodiment comprising: a captured image data acquiring unit that acquires captured image data captured by an image capturing unit that captures an image of surroundings of a vehicle; an event detecting unit that detects an event occurred with respect to the vehicle; a recording control unit that stores the captured image data acquired by the captured image data acquiring unit as normal recording data that is not based on the event and as event recording data that is based on the event; a communication control unit that establishes a connection with a communication terminal; and an access control unit that, when the communication terminal in which the connection has been established by the communication control unit is a registered terminal that is the communication terminal that has been registered in advance, allows the registered terminal to access the normal recording data and the event recording data, and that, when the communication terminal in which the connection has been established by the communication control unit is an unregistered terminal that is the communication terminal that has not been registered in advance, does not allow the unregistered terminal to access the normal recording data and allows the unregistered terminal to access the event recording data.

Further, in order to solve the above problem and achieve the above object, an on-vehicle recording control method according to an embodiment comprising: a captured image data acquiring step of acquiring captured image data captured by an image capturing unit that captures an image of surroundings of a vehicle; an event detecting step of detecting an event occurred with respect to the vehicle; a recording controlling step of storing the captured image data acquired at the captured image data acquiring step as normal recording data that is not based on the event and as event recording data that is based on the event; a communication controlling step of establishing a connection with a communication terminal; and an access controlling step of, when the communication terminal in which the connection has been established at the communication controlling step is a registered terminal that is the communication terminal that has been registered in advance, allowing the registered terminal to access the normal recording data and the event recording data, and when the communication terminal in which the connection has been established at the communication controlling step is an unregistered terminal that is the communication terminal that has not been registered in advance, not allowing the unregistered terminal to access the normal recording data and allowing the unregistered terminal to access the event recording data.

Further, in order to solve the above problem and achieve the above object, a non-transitory computer readable recording medium storing therein a program according to an embodiment that causes a computer operated as an on-vehicle recording control device to execute a process comprising: a captured image data acquiring step of acquiring captured image data captured by an image capturing unit that captures an image of surroundings of a vehicle; an event detecting step of detecting an event occurred with respect to the vehicle; a recording controlling step of storing the captured image data acquired at the captured image data acquiring step as normal recording data that is not based on the event and as event recording data that is based on the event; a communication controlling step of establishing a connection with a communication terminal; and an access controlling step of, when the communication terminal in which the connection has been established at the communication controlling step is a registered terminal that is the communication terminal that has been registered in advance, allowing the registered terminal to access the normal recording data and the event recording data, and when the communication terminal in which the connection has been established at the communication controlling step is an unregistered terminal that is the communication terminal that has not been registered in advance, not allowing the unregistered terminal to access the normal recording data and allowing the unregistered terminal to access the event recording data.

According to the on-vehicle recording apparatus, the on-vehicle recording control method, and the medium according to the present embodiment, an advantage is provided in that it is possible to check information on an event while ensuring protection of privacy.

DETAILED DESCRIPTION OF THE PREFERRED EMBODIMENTS

Preferred embodiments of an on-vehicle recording apparatus, an on-vehicle recording control method, and a medium according to the present disclosure will be described in detail below with reference to the accompanying drawings. Furthermore, the present invention is not limited to the embodiments described below. In addition, the components described in the embodiments below include one that can be replaced and easily conceived by those skilled in the art or one that is substantially identical.

First Embodiment

<On-Vehicle Recording Apparatus>

Figure 1:
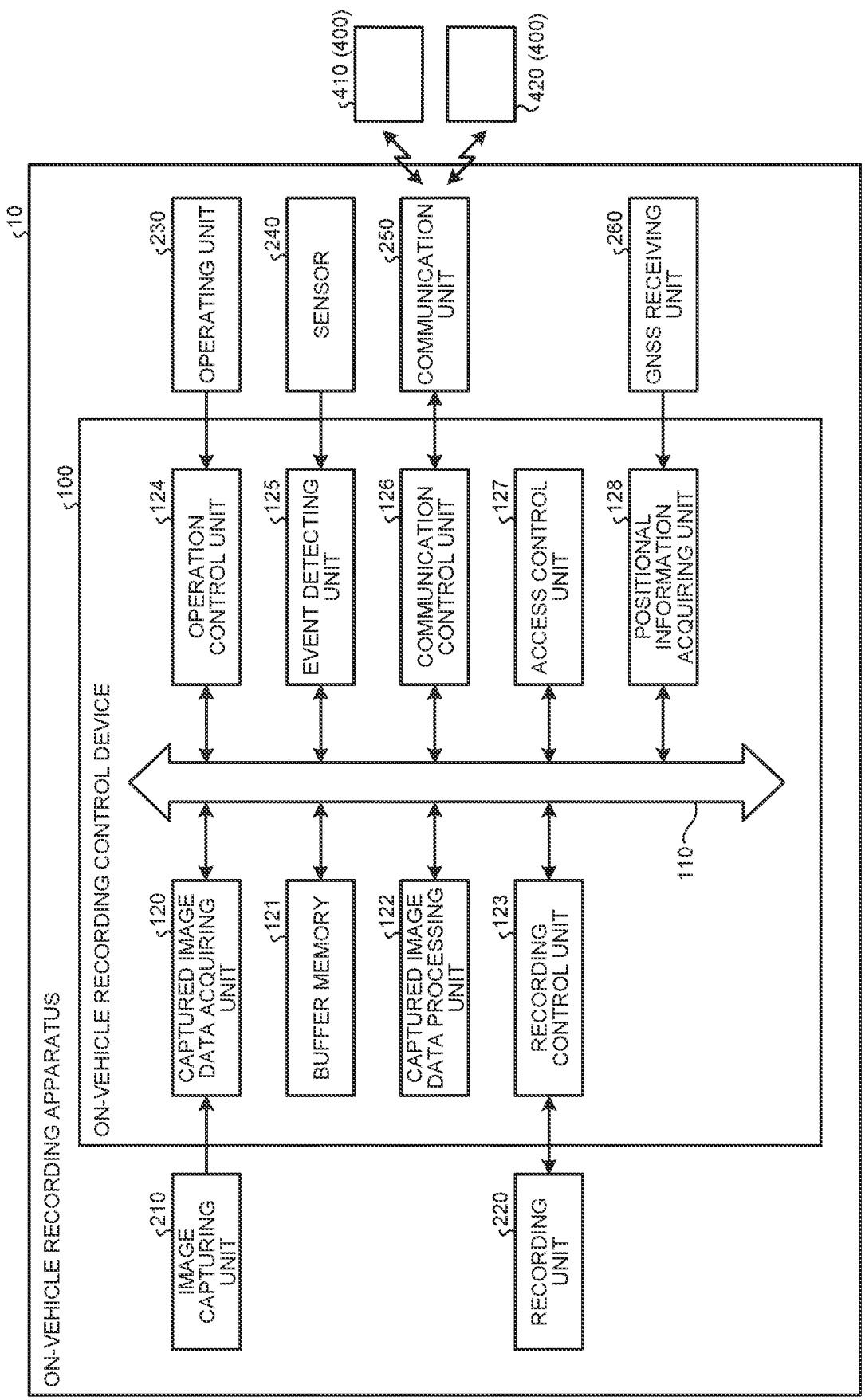
FIG. 1 is a block diagram illustrating an example of a configuration of an on-vehicle recording apparatus according to a first embodiment.

FIG. 1 is a block diagram illustrating an example of a configuration of an on-vehicle recording apparatus 10 according to a first embodiment. The on-vehicle recording apparatus 10 is what is called a dashboard camera, is installed in the vicinity of a front window or a rear window in a room of a vehicle, and is, in normal cases, driven by electrical power supplied from the vehicle. Furthermore, the on-vehicle recording apparatus 10 has a built-in battery (not illustrated), and is able to be driven by the built-in battery in the case where a supply of electrical power from the vehicle is stopped caused by an accident occurred in the vehicle. The on-vehicle recording apparatus 10 may also be a portable type apparatus that can be used in a vehicle, in addition to a type that is mounted on a vehicle.

The on-vehicle recording apparatus 10 includes an image capturing unit 210, a recording unit 220, an operating unit 230, a sensor 240, a communication unit 250, a global navigation satellite system (GNSS) receiving unit 260, and an on-vehicle recording control device (hereinafter, referred to as a "control device") 100.

The image capturing unit 210 is a camera that captures an images of the surroundings of the vehicle in which the on-vehicle recording apparatus 10 is installed and that is able to output data as an electrical signal. In the first embodiment, the image capturing unit 210 is arranged in the vicinity of the front window in the room of the vehicle so as to face the front of the vehicle, and mainly captures an image of the surroundings in front of the vehicle. The image capturing unit 210 captures an image of a wide angle, for example, in an image capturing range of about 180° in a horizontal direction. The image capturing unit 210 outputs the obtained image of captured image data 300 (see FIG. 2) to a captured image data acquiring unit 120 that is included in the control device 100.

The recording unit 220 is used to temporarily store data of the on-vehicle recording apparatus 10 or the like. The recording unit 220 is, for example, a semiconductor memory device, such as a random access memory (RAM) or a flash memory, or a recording unit, such as a memory card. Alternatively, the recording unit 220 may be an external recording unit that is wirelessly connected via a communication device (not illustrated). The recording unit 220 records therein the captured image data 300 acquired by the captured image data acquiring unit 120 on the basis of a control signal output from a recording control unit 123 that is included in the control device 100.

The operating unit 230 is an input unit that is able to receive various kinds of operation performed with respect to the on-vehicle recording apparatus 10. For example, the operating unit 230 is able to receive setting of time associated with a single piece of moving image data, i.e., setting of intervals of time for generating the moving image data, at the time when the captured image data 300 is recorded in the recording unit 220 as moving image data. Furthermore, the operating unit 230 is able to receive an operation for manually recording an event. The operating unit 230 outputs the input operation information to an operation control unit 124 that is included in the control device 100.

The sensor 240 functions as an event detecting unit that is able to detect an event occurred with respect to the vehicle in which the on-vehicle recording apparatus 10 is installed, and outputs a detection result to an event detecting unit 125 that is included in the control device 100. The sensor 240 is what is called an acceleration sensor that detects acceleration and detects acceleration in, for example, 3-axis directions. The 3-axis directions are a front-back direction, a left-right direction, and a vertical direction of the vehicle. The sensor 240 is able to detect an impact shock exerted on the vehicle caused by the acceleration in the 3-axis directions.

The communication unit 250 is a communication unit that is able to perform communication with an external communication terminal 400. The communication unit 250 is able to perform wireless communication with the communication terminal 400 that is located outside the on-vehicle recording apparatus 10 by using a method of Wi-Fi (registered trademark), Bluetooth (registered trademark), or the like. The communication terminal 400 that is used at this time may be, for example, a portable information terminal device, such as a smartphone, a tablet personal computer, or a notebook personal computer.

The GNSS receiving unit 260 receives radio waves emitted from a plurality of positioning satellite included in the GNSS. The GNSS receiving unit 260 outputs signals of the received radio waves to a positional information acquiring unit 128 that is included in the control device 100.

The control device 100 is an arithmetic processing device (control device) that is constituted of, for example, a central processing unit (CPU) or the like. The control device 100 loads a stored program into a memory and executes a command included in the program. The control device 100 includes an internal memory (not illustrated), and the internal memory is used to temporarily store data of the control device 100. The control device 100 includes the captured image data acquiring unit 120, a buffer memory 121, a captured image data processing unit 122, the recording control unit 123, the operation control unit 124, the event detecting unit 125, a communication control unit 126, an access control unit 127, and the positional information acquiring unit 128, all of which are connected to a bus 110.

The captured image data acquiring unit 120 acquires the captured image data 300 on an image obtained by capturing the surroundings of the vehicle. More specifically, the captured image data acquiring unit 120 acquires the captured image data 300 that is output by the image capturing unit 210 that captures an image of the surroundings of the vehicle.

The buffer memory 121 is a memory that temporarily stores therein captured image data. The buffer memory 121 is a memory that temporarily stores therein, for example, the captured image data 300, which has been captured for a certain period of time by the captured image data acquiring unit 120, while updating the captured image data 300.

The captured image data processing unit 122 converts the captured image data 300 (hereinafter, referred to as "temporary captured image data") that is temporarily stored in the buffer memory 121 into an arbitrary file format, such as the MP4 format, which is encoded by an arbitrary method, such as H.264 or Moving Picture Experts Group (MPEG)-4. The captured image data processing unit 122 generates, from the temporary captured image data, the captured image data 300 in which moving image data for a certain period of time is defined as a single file. As a specific example, the captured image data processing unit 122 generates the captured image data 300 obtained in a predetermined period of time as a single file in the order in which the pieces of temporary captured image data are recorded, and generates a plurality of files constituted of the captured image data 300 obtained in the predetermined period of time in accordance with the capturing time of the image captured by the image capturing unit 210. The predetermined period of time used in this case is a period of time (for example, 60 seconds) that has been set by an input operation performed onto the operating unit 230. The captured image data processing unit 122 outputs the captured image data 300 that has been generated in this way to the recording control unit 123. Furthermore, the period of time related to the captured image data 300 that is generated as a single file is set to 60 seconds as one example; however, the example is not limited to this. In addition, the captured image data 300 mentioned here may be data including a sound in addition to video images captured by the image capturing unit 210.

Figure 2:
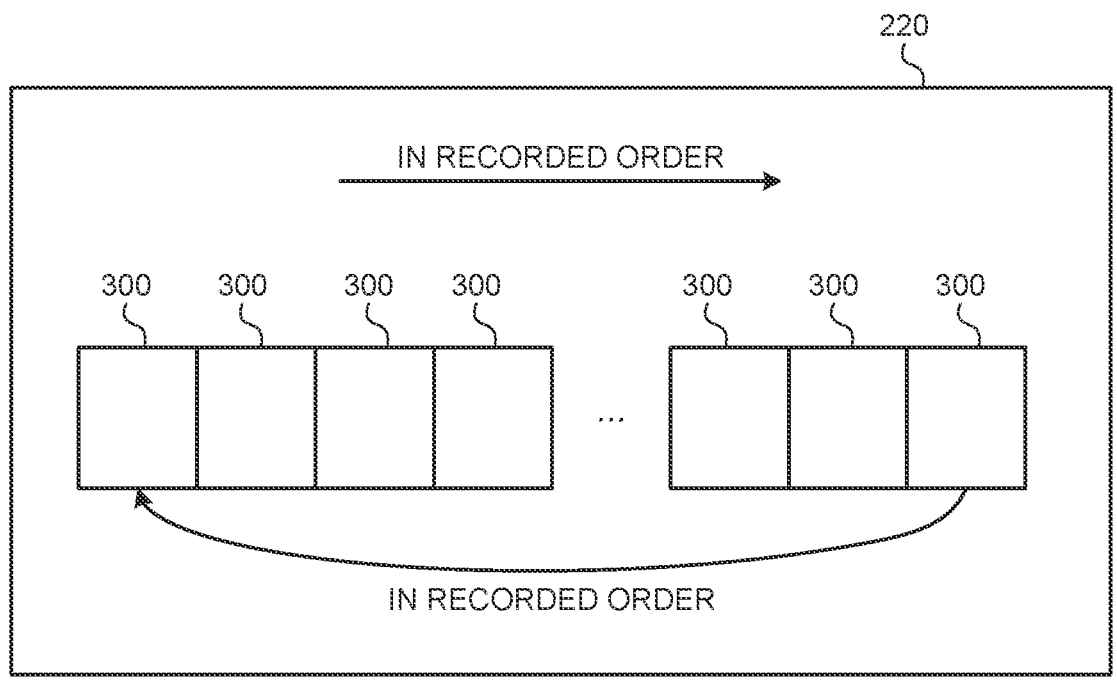
FIG. 2 is a conceptual diagram illustrating loop recording of captured image data.

FIG. 2 is a conceptual diagram illustrating loop recording of the captured image data 300. The recording control unit 123 performs control of causing the recording unit 220 to record the captured image data 300 that has been converted to the file format by the captured image data processing unit 122. In the case where an operation of loop recording is set, the recording control unit 123 performs a loop recording process, and records, in the recording unit 220, the captured image data 300 that has been converted to the file format by the captured image data processing unit 122 as the captured image data 300 that can be overwritten. More specifically, in a period of time for which the loop recording process is being performed, the recording control unit 123 continuously records the captured image data 300 generated by the captured image data processing unit 122 into the recording unit 220, and, if the capacity of the recording unit 220 becomes full, the recording control unit 123 records the new captured image data 300 by overwriting the oldest captured image data 300.

The operation control unit 124 acquires operation information on an operation received by the operating unit 230. The operation control unit 124 acquires, for example, configuration information on a time interval that is used when the captured image data 300 is sored as a file of the moving image data at intervals of a predetermined period of time, operation information indicating whether or not event recording is manually performed, and the like, and then, outputs control signals on these pieces of information.

The event detecting unit 125 detects an event occurred with respect to the vehicle. An arbitrary method may be used by the event detecting unit 125 to detect an event occurred with respect to the vehicle, but, as one example, the event detecting unit 125 detects an event on the basis of a detection result obtained by the sensor 240. In this case, if acceleration that is equal to or larger than a threshold of the acceleration detected by the sensor 240 is detected, the event detecting unit 125 detects this state as an event. A threshold at which an impact exerted on the vehicle is detected is set in advance to the acceleration that is detected by the event detecting unit 125 as an event.

Figure 3:
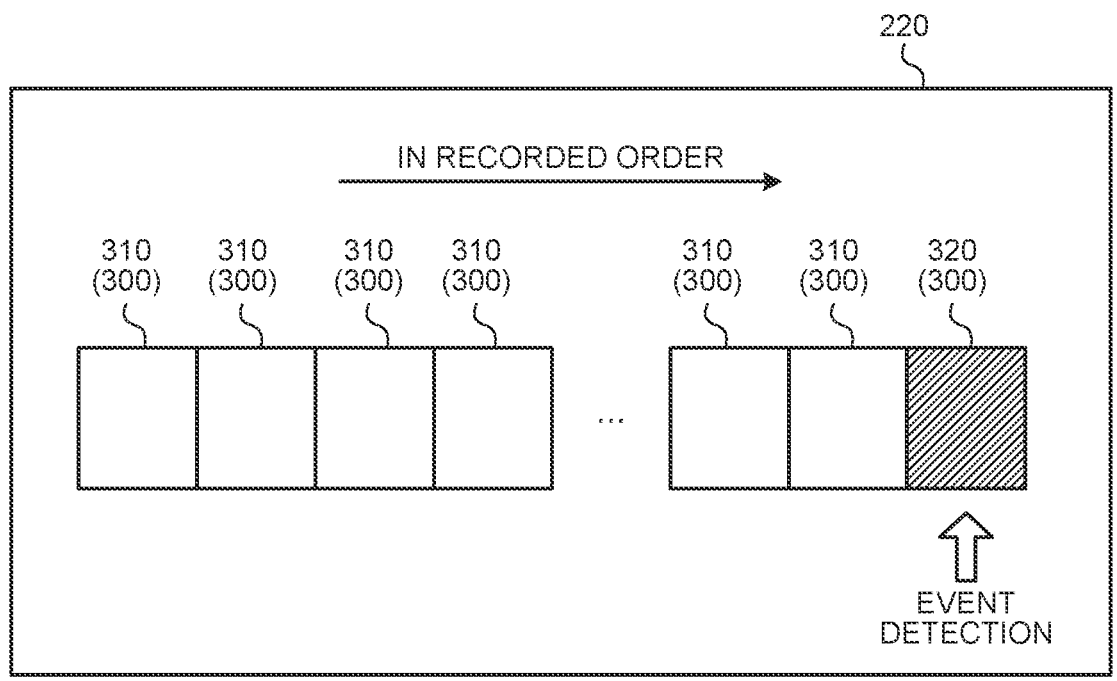
FIG. 3 is a conceptual diagram at the time when captured image data is stored as normal recording data or event recording data.

FIG. 3 is a conceptual diagram at the time when the captured image data 300 is stored as normal recording data 310 or event recording data 320. When the event detecting unit 125 detects an event, the recording control unit 123 described above stores, in the recording unit 220 as the event recording data 320 for which overwrite is prohibited, the captured image data 300 obtained in a predetermined time period that includes at least a time point at which an event has been detected from among the pieces of captured image data 300 generated by the captured image data processing unit 122.

In other words, the recording control unit 123 stores, in the recording unit 220, the pieces of captured image data 300 acquired by the captured image data acquiring unit 120 as the normal recording data 310 that is not based on an event and the event recording data 320 that is based on an event. Namely, from among the pieces of captured image data 300 acquired by the captured image data acquiring unit 120, the recording control unit 123 stores the captured image data 300 that is not based on an event as the normal recording data 310 for which overwrite is allowed, and stores the captured image data 300 that is on the basis of the event as the event recording data 320 for which overwrite is prohibited.

A predetermined time period caused by detection of the event that is a criterion for determination whether the captured image data 300 is the captured image data 300 that is not based on an event or the captured image data 300 that is based on an event is, for example, a predetermined time period from an event detection time point or a time period before and after the event detection time point including the event detection time point. If the captured image data 300 is captured in the predetermined time period from the event detection time point or captured in the time period before and after the event detection time point including the event detection time point, the recording control unit 123 stores the captured image data 300 as the event recording data 320 that is based on the event, and, if the captured image data 300 is captured in a time period other than these time periods, the recording control unit 123 stores the captured image data 300 as the normal recording data 310 that is not based on the event.

Determination of whether the captured image data 300 is not based on the event or the captured image data 300 is based on the event may be determined on the basis of a recording area that is recorded in the recording unit 220. For example, the captured image data 300 that is based on the event is stored in an overwrite-prohibited area that is different from the area for storing the captured image data 300 that is not based on the event.

The communication control unit 126 establishes a connection with the external communication terminal 400 that performs communication with the communication unit 250, and performs control of communication to be performed with the communication terminal 400 via the communication unit 250. Namely, by setting a state in which communication is able to be performed with the external communication terminal 400 via the communication unit 250, the communication control unit 126 establishes a connection with the communication terminal 400 and performs control of communication at the time when a signal or data is transmitted or received to or from the communication terminal 400.

Establishment of the connection with the communication terminal 400 may be performed by allowing, for example, the communication unit 250 to include a device that is able to perform communication with the communication terminal 400 using near field communication (NFC) and perform NFC authentication of the communication terminal 400, so as to enable communication between the authenticated communication terminal 400 and the communication unit 250 using Wi-Fi. In addition, for example, it may be possible to easily establish subsequent connections with the same communication terminal 400 by configuring the communication unit 250 so as to be able to perform communication using Bluetooth and perform pairing with the communication terminal 400 using a Bluetooth connection.

The access control unit 127 performs control whether or not the communication terminal 400 is able to access the captured image data 300 that is stored in the recording unit 220 according to whether or not the communication terminal 400 in which the connection has been established by the communication control unit 126 is the communication terminal 400 that has been registered in advance. In other words, the on-vehicle recording apparatus 10 is able to register the communication terminal 400, and the access control unit 127 uses a different mode in terms of an access to the captured image data 300 stored in the recording unit 220 according to whether or not the communication terminal 400 has been registered.

Specifically, if the communication terminal 400 in which a connection has been established by the communication control unit 126 is a registered terminal 410 that is the communication terminal 400 that has been registered in advance, the access control unit 127 performs control such that the registered terminal 410 is allowed to access the normal recording data 310 and the event recording data 320. In contrast, if the communication terminal 400 in which a connection has been established by the communication control unit 126 is an unregistered terminal 420 that is the communication terminal 400 that has not been registered in advance, the access control unit 127 performs control such that the unregistered terminal 420 is not allowed to access the normal recording data 310 but is allowed to access the event recording data 320.

The communication terminal 400 is registered by performing an input operation related to the registration of the communication terminal 400 with respect to the operating unit 230. For example, by performing an input operation related to the registration with respect to the operating unit 230 in a state in which a connection of the communication terminal 400 has been established by the communication control unit 126, the communication terminal 400 in which a connection is currently established is registered as the registered terminal 410. Alternatively, by performing an input operation related to registration to the operating unit 230 and establishing a connection of the communication terminal 400 in a registration mode with respect to the communication terminal 400, the communication terminal 400 in which a connection has been established is accordingly registered as the registered terminal 410.

The information on the communication terminal 400 that is registered as the registered terminal 410 in this way is stored in the internal memory included in the control device 100. Regarding the information on the communication terminal 400, for example, information that is uniquely assigned to the communication terminal 400 and that is able to specify the communication terminal 400 is registered. The access control unit 127 determines whether or not the communication terminal 400 in which a connection has been established is the registered terminal 410 by checking the information on the communication terminal 400 in which the connection has been established by the communication control unit 126 against the information on the registered terminal 410 stored in the internal memory.

The positional information acquiring unit 128 calculates positional information on the current position of the vehicle, on the basis of the radio waves received by the GNSS receiving unit 260, by using a known method. In the case where the event detecting unit 125 detects an event, the positional information calculated by the positional information acquiring unit 128 is stored together with the event recording data 320.

<Process Performed in On-Vehicle Recording Apparatus>

Figure 4:
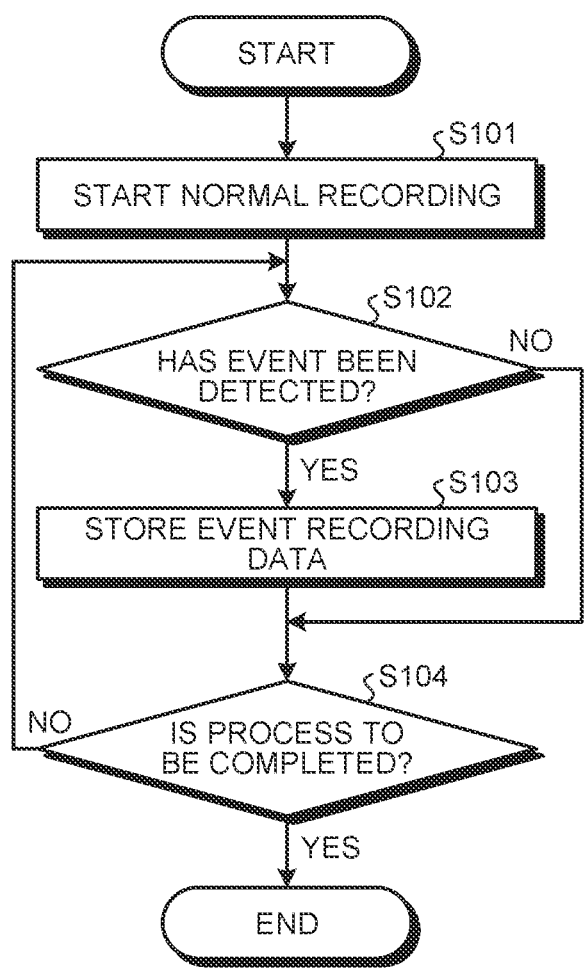
FIG. 4 is a flowchart illustrating the flow of a process performed in an on-vehicle recording control device according to the first embodiment.

In the following, the flow of a process performed in the control device 100 will be described with reference to FIG. 4. FIG. 4 is a flowchart illustrating the flow of the process performed in the on-vehicle recording control device 100 according to the first embodiment. Here, a case in which a loop recording process is performed will be described.

If an operation of the on-vehicle recording apparatus 10 is started, the control device 100 starts normal recording (Step S101). That is, the captured image data 300 captured by the image capturing unit 210 that captures an image of the surroundings of the vehicle is acquired by the captured image data acquiring unit 120, and is stored in the recording unit 220 as the normal recording data 310. Specifically, the control device 100 generates, by using the captured image data processing unit 122, a file obtained for each predetermined time interval from the captured image data 300 that has been acquired by the captured image data acquiring unit 120 and recorded in the buffer memory 121, and then, performs, by using the recording control unit 123, loop recording into the recording unit 220 as the normal recording data 310.

Then, the control device 100 determines, by using the event detecting unit 125, whether or not an event occurred with respect to the vehicle has been detected (Step S102). Specifically, the event detecting unit 125 detects an occurrence of an event based on whether or not the acceleration detected by the sensor 240 is equal to or larger than the threshold that has been set in advance. That is, if the acceleration detected by the sensor 240 is less than the threshold, the event detecting unit 125 does not detect an event occurred with respect to the vehicle. In contrast, if the acceleration detected by the sensor 240 is equal to or larger than the threshold, the event detecting unit 125 detects that a large impact has occurred with respect to the vehicle and an event has occurred with respect to the vehicle.

If the event detecting unit 125, which detects an event on the basis of the acceleration that has been detected by the sensor 240 in this way, detects that an event has occurred with respect to the vehicle (Yes at Step S102), the control device 100 stores the event recording data 320 (Step S103). Specifically, if the event detecting unit 125 detects that the event has occurred with respect to the vehicle, the control device 100 stores, by using the recording control unit 123, the captured image data 300 obtained in a predetermined time period including at least an occurrence time point of the event in the recording unit 220 as the event recording data 320 for which overwrite is prohibited.

After the control device 100 has stored the event recording data 320, the control device 100 determines whether or not the recording process performed, by using the on-vehicle recording apparatus 10, on the captured image data 300 it to be completed (Step S104). Furthermore, in the case where the event detecting unit 125 does not detect an event occurred with respect to the vehicle (No at Step S102), the control device 100 similarly determines whether or not the recording process performed on the captured image data 300 is to be completed (Step S104).

Specifically, the control device 100 determines whether or not the recording process performed on the captured image data 300 by the on-vehicle recording apparatus 10 is to be completed based on whether or not information indicating that an exit operation has been performed is output from the operation control unit 124 that acquires operation information on an operation received by the operating unit 230. Alternatively, as a result of a supply of electrical power from the vehicle being stopped due to completion of the use of the vehicle, the recording process performed on the captured image data 300 by the on-vehicle recording apparatus 10 is completed. If the information indicating that the exit operation has been performed is not output from the operation control unit 124 (No at Step S104), the control device 100 returns to Step S102 and continues the recording process to be performed on the captured image data 300 by the on-vehicle recording apparatus 10. That is, the loop recording process on the captured image data 300 by the control device 100 is continued.

In contrast, if it is determined that the recording process on the captured image data 300 is to be completed (Yes at Step S104), the recording process on the captured image data 300 performed by the on-vehicle recording apparatus 10 is completed.

Furthermore, in normal time, the on-vehicle recording apparatus 10 is driven by the electrical power supplied from the vehicle, so that, even if a supply of electrical power to the on-vehicle recording apparatus 10 is stopped due to an end of driving of the vehicle, the recording process performed on the captured image data 300 by the on-vehicle recording apparatus 10 is virtually completed. In contrast, if a supply of electrical power from the vehicle is stopped caused by an accident occurred in the vehicle, the on-vehicle recording apparatus 10 continues to drive by using a built-in battery and perform the recording process on the captured image data 300.

As described above, the on-vehicle recording apparatus 10 that stores the captured image data 300 captured by the image capturing unit 210 in the recording unit 220 is able to perform communication with the communication terminal 400, and the communication terminal 400 in which a connection has been established by the communication control unit 126 is able to access the captured image data 300. As a result, it is possible to check the captured image data 300, which is stored in the recording unit 220 included in the on-vehicle recording apparatus 10, by the communication terminal 400 in which the connection has been established. For example, in the case where the captured image data 300 stored in the recording unit 220 is moving image data, the captured image data 300 is able to be visually checked as the moving image by the communication terminal 400 in which the connection has been established.

Here, the captured image data 300 is stored as the normal recording data 310 or the event recording data 320; however, the communication terminal 400 in which the connection has been established has a different access mode with respect to the captured image data 300 depending on whether or not the communication terminal 400 has been registered in the on-vehicle recording apparatus 10 in advance.

In other words, in the case where the communication terminal 400 in which the connection has been established is the registered terminal 410 that has been registered in advance, the registered terminal 410 is able to access the normal recording data 310 and the event recording data 320. As a result, the registered terminal 410 is able to check the normal recording data 310 and the event recording data 320 that are stored in the recording unit 220.

In contrast, in the case where the communication terminal 400 in which the connection has been established is the unregistered terminal 420 that has not been registered in advance, the unregistered terminal 420 is not allowed to access the normal recording data 310 and is allowed to access the event recording data 320. As a result, the unregistered terminal 420 is able to check the event recording data 320, even though the unregistered terminal 420 is not able to check the normal recording data 310 stored in the recording unit 220.

Figure 5:
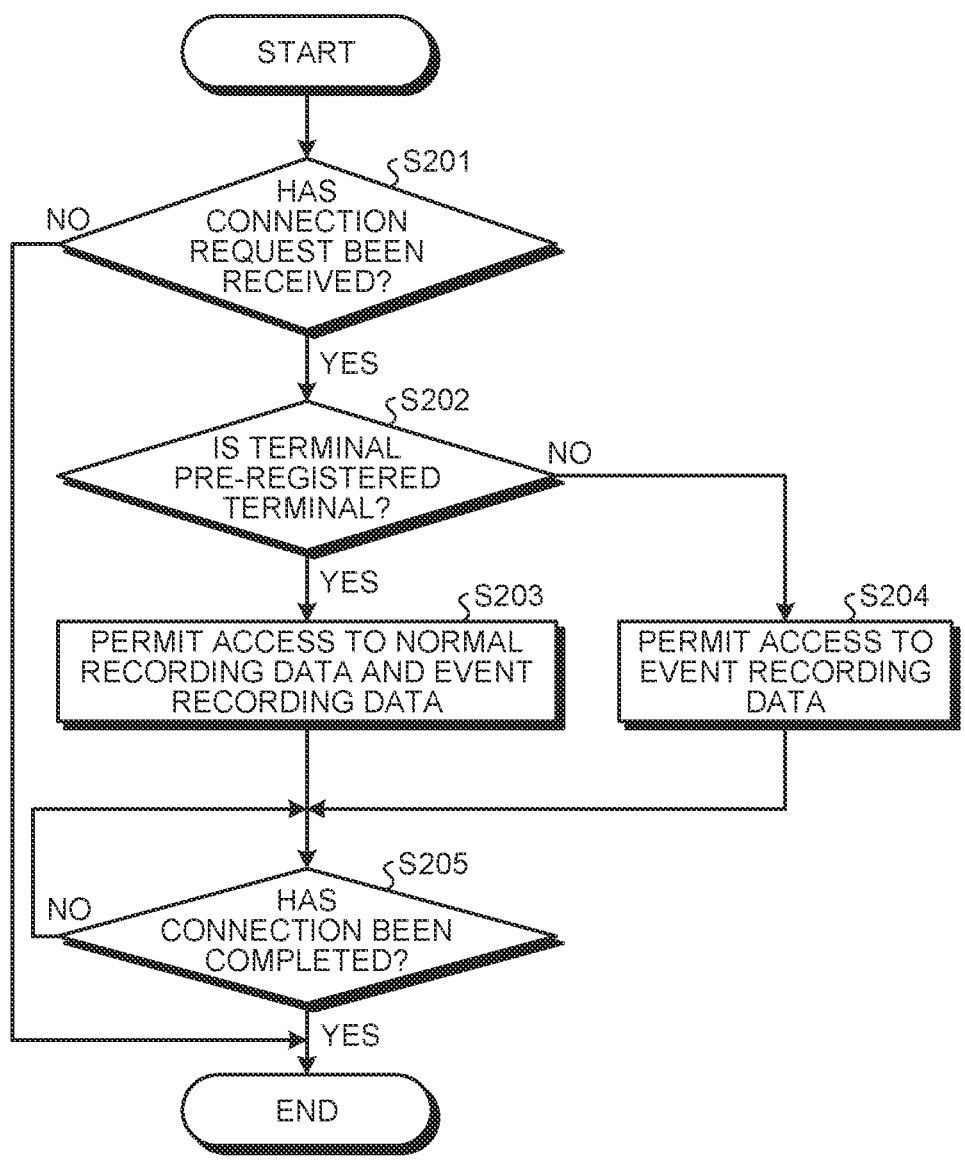
FIG. 5 is a flowchart illustrating the flow of a process related to an access to captured image data performed by a communication terminal.

In the following, the flow of the process of accessing the captured image data 300 performed by the communication terminal 400 that performs communication with the on-vehicle recording apparatus 10 will be described with reference to FIG. 5. FIG. 5 is a flowchart illustrating the flow of the process related to an access to the captured image data 300 performed in the communication terminal 400. In a period of time for which the on-vehicle recording apparatus 10 is being used, the control device 100 continuously receives a connection request from the communication terminal 400 and establishes a connection in the case where a connection request from the communication terminal 400 is received. Accordingly, in a period of time for which the on-vehicle recording apparatus 10 is being used, the control device 100 continuously calls a subroutine or a program related to a connection with the communication terminal 400, and performs a process related to a connection with the communication terminal 400.

In the process related to the connection with the communication terminal 400, first, it is determined whether or not a connection request has been received from the communication terminal 400 (Step S201). Specifically, the control device 100 determines whether or not a connection request has been received from the communication terminal 400 to the communication control unit 126 that controls communication with the communication terminal 400 via the communication unit 250. That is, it is determined whether or not the communication unit 250 has received a signal of the connection request from the communication terminal 400.

As a result of this determination, if it is determined that the connection request from the communication terminal 400 to the communication control unit 126 or the communication unit 250 has not been received (No at Step S201), the process related to the connection with the communication terminal 400 is completed, and, the process is started again from Step S201 when the process related to this connection is again called.

In contrast, if it is determined that the connection request from the communication terminal 400 to the communication control unit 126 or the communication unit 250 has been received (Yes at Step S201), the communication control unit 126 establishes a connection with the communication terminal 400 via the communication unit 250.

If the connection with the communication terminal 400 has been established by the communication control unit 126, then, the control device 100 determines whether or not the communication terminal 400 in which the connection has been established is the communication terminal 400 that has been registered in advance (Step S202). Specifically, the control device 100 determines whether or not the communication terminal 400 in which the connection has been established by the communication control unit 126 is the registered terminal 410 that has been registered in advance or the unregistered terminal 420 that has not been registered in advance.

As a result of this determination, if it is determined that the communication terminal 400 in which the connection has been established is the registered terminal 410 that is the communication terminal 400 that has been registered in advance (Yes at Step S202), an access to the normal recording data 310 and the event recording data 320 is permitted (Step S203). That is, in the case where the communication terminal 400 in which the connection has been established is the registered terminal 410 that is the communication terminal 400 that has been registered in advance, regarding an access to the captured image data 300 stored in the recording unit 220 performed by the registered terminal 410, the access control unit 127 permits the access to all of the pieces of captured image data 300. As a result, the registered terminal 410 in which the connection has been established is allowed to access the normal recording data 310 and the event recording data 320, so that the registered terminal 410 is able to check the normal recording data 310 and the event recording data 320.

In the case where the communication terminal 400 in which the connection has been established is the registered terminal 410, for example, a list of the normal recording data 310 and the event recording data 320, setting menus of the on-vehicle recording apparatus 10, or the like is displayed on the registered terminal 410 side. The registered terminal 410 is able to select and replay one of the pieces of captured image data 300 or acquire (download) the captured image data 300 from the list of the normal recording data 310 and the event recording data 320. As a result, the registered terminal 410 is able to check the normal recording data 310 and the event recording data 320.

In contrast, in the case where it is determined that the communication terminal 400 in which the connection has been established is not the registered terminal 410 that has not been registered in advance (No at Step S202), an access to the event recording data 320 is permitted (Step S204). That is, in the case where the communication terminal 400 in which the connection has been established is the unregistered terminal 420 that is the communication terminal 400 that has not been registered in advance, regarding an access from the unregistered terminal 420 to the captured image data 300 that is stored in the recording unit 220, an access to the normal recording data 310 is not allowed and an access to the event recording data 320 is permitted by the access control unit 127. As a result, the unregistered terminal 420 in which the connection has been established is not able to access the normal recording data 310 but is able to access the event recording data 320, so that the unregistered terminal 420 is able to check only the event recording data 320.

In the case where the communication terminal 400 in which the connection has been established is the unregistered terminal 420, for example, by allowing only the list of the event recording data 320 to be displayed and allowing the selected event recording data 320 to be replayed on the unregistered terminal 420 side, the unregistered terminal 420 is able to check only the event recording data 320. Furthermore, in the case where the communication terminal 400 in which the connection has been established is the unregistered terminal 420, it is preferable that download of the captured image data 300 is not allowed in the unregistered terminal 420.

As described above, if an access to the captured image data 300 is limited in accordance with the communication terminal 400 in which the connection has been established, then, it is determined whether or not the connection of the communication terminal 400 has been completed (Step S205). Specifically, the control device 100 determines whether or not establishment of the connection between the communication terminal 400 and the communication control unit 126 via the communication unit 250 is continued.

As a result of this determination, in the case where it is determined that the establishment of the connection between the communication terminal 400 and the communication control unit 126 is continued and it is determined that the connection of the communication terminal 400 has not been completed (No at Step S205), the state in which the access is permitted at Step S203 or Step S204 is maintained, and determination whether or not the connection of the communication terminal 400 has been completed is repeated.

In contrast, in the case where it is determined that the connection between the communication terminal 400 and the communication control unit 126 has been completed and it is determined that the connection of the communication terminal 400 has been completed (Yes at Step S205), the process related to the connection with the communication terminal 400 is completed, and, the process is started again from Step S201 when the process related to this connection is again called.

<Effects>

As described above, in the first embodiment, in the case where the communication terminal 400 in which the connection with the on-vehicle recording apparatus 10 has been established is the registered terminal 410, the registered terminal 410 is allowed to access the normal recording data 310 and the event recording data 320. Accordingly, for example, as a result of the communication terminal 400 in which the connection with the on-vehicle recording apparatus 10 has been established registering, as the registered terminal 410, the communication terminal 400, such as a smartphone owned by a user, that is used by a driver, the registered terminal 410 is able to easily check the captured image data 300.

Furthermore, in the case where the communication terminal 400 in which the connection with the on-vehicle recording apparatus 10 has been established is the unregistered terminal 420, the unregistered terminal 420 is not allowed to the normal recording data 310. Accordingly, in the case where the communication terminal 400 in which the connection with the on-vehicle recording apparatus 10 has been established is the communication terminal 400 that has not been registered in the on-vehicle recording apparatus 10, the communication terminal 400 is not able to check the normal recording data 310, so that it is possible to prevent the normal recording data 310 from being able to be checked by a third party by using the unregistered terminal 420. As a result, it is possible to prevent the normal recording data 310 from being checked and prevent information on locations or the like visited by the vehicle from being unintentionally found out by the third party, and it is possible to protect privacy of the user.

In contrast, even in the case where the communication terminal 400 in which the connection with the on-vehicle recording apparatus 10 has been established is the communication terminal 400 that has not been registered in the on-vehicle recording apparatus 10, an access from the unregistered terminal 420 to the event recording data 320 is allowed. Accordingly, it is possible to easily check the event recording data 320 recorded at the time of an occurrence of an event, such as an accident occurred in the vehicle, by a third party by using the unregistered terminal 420. As a result, even in the case where the event recording data 320 is not able to be checked by using the registered terminal 410 owned by the driver of the vehicle due to the occurrence of the event, such as the accident, it is possible to easily check the event recording data 320 by using the unregistered terminal 420 owned by the third party, and it is possible to easily check the circumstances of the event by using the unregistered terminal 420. As a result, it is possible to check the information on the event while ensuring protection of the privacy.

Second Embodiment

The on-vehicle recording apparatus 10 according to a second embodiment has substantially the same configuration as that of the on-vehicle recording apparatus 10 according to the first embodiment, but one feature of the second embodiment is that the unregistered terminal 420 is allowed to access most recent event recording data 320a. The other configurations are the same as those described in the first embodiment; therefore, descriptions thereof will be omitted and the same reference numerals are assigned.

Figure 6:
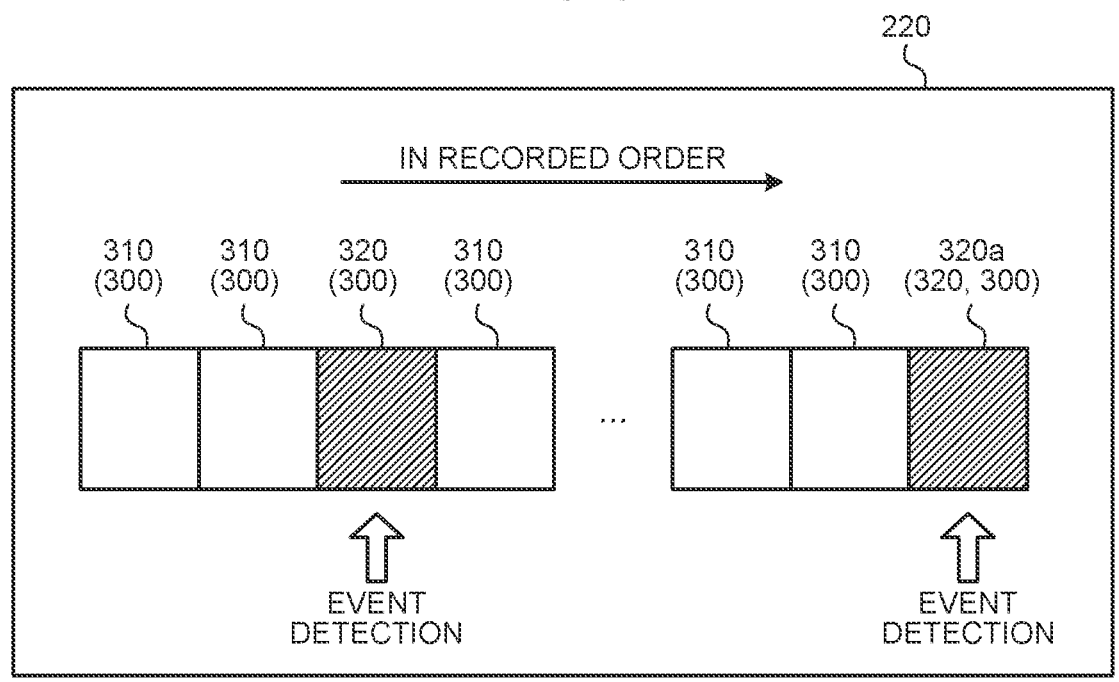
FIG. 6 is a conceptual diagram in a case in which a plurality of pieces of event recording data are stored.

FIG. 6 is a conceptual diagram in a case in which a plurality of pieces of the event recording data 320 are stored. In some cases, the on-vehicle recording apparatus 10 detects an event and stores the captured image data 300 as the event recording data 320, and then, again stores the captured image data 300 as the event recording data 320 by detecting an event as a result of an accident occurring in a vehicle in which the on-vehicle recording apparatus 10 is installed. Furthermore, the event recording data 320 is stored in the recording unit 220 in an overwrite-prohibited manner, so that, even in the case where the normal recording data 310 is overwritten by a loop recording process, the event recording data 320 is continuously stored in the recording unit 220. Accordingly, in the case where the on-vehicle recording apparatus 10 detects an event more than once, a plurality of pieces of the event recording data 320 are consequently stored in the recording unit 220.

In the on-vehicle recording apparatus 10 according to the second embodiment, in the case where the access control unit 127 included in the control device 100 receives a connection request from the unregistered terminal 420, the access control unit 127 permits the unregistered terminal 420 to access the most recent event recording data 320a. Accordingly, in the case where the event recording data 320 is stored in the recording unit 220, the unregistered terminal 420 in which the connection has been established is not able to access the old event recording data 320 but is able to access only the most recent event recording data 320a.

For example, in the case where a connection between the on-vehicle recording apparatus 10 and the unregistered terminal 420 has been established, presence or absence of the most recent event recording data 320a is displayed on the unregistered terminal 420 side, and the most recent event recording data 320a is allowed to be replayed in the unregistered terminal 420. As a result, the unregistered terminal 420 in which the connection with the on-vehicle recording apparatus 10 has been established is able to check only the most recent event recording data 320a. Furthermore, it is preferable to set the unregistered terminal 420 such that only a replay of the most recent event recording data 320a is allowed and download of the most recent event recording data 320a is not allowed.

Figure 7:
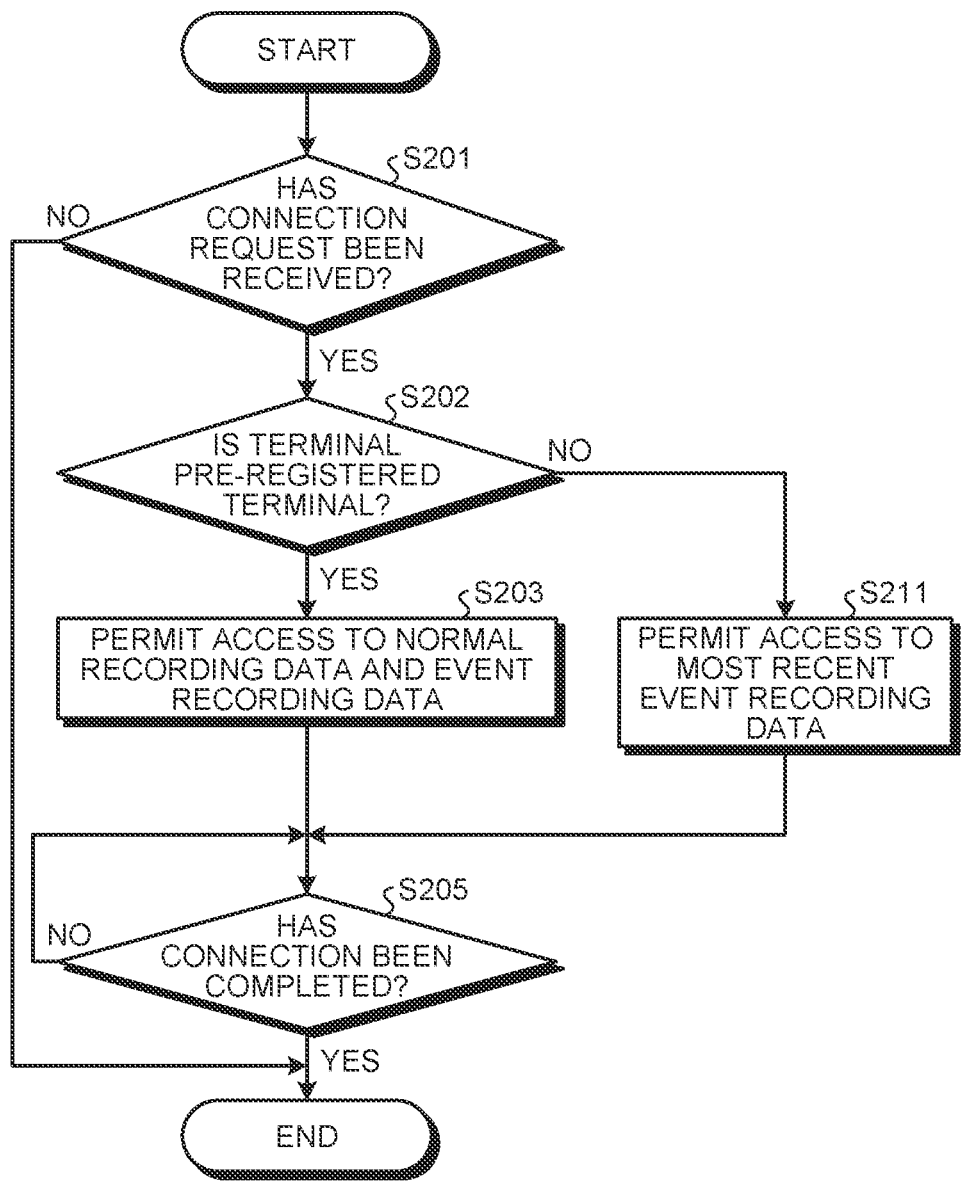
FIG. 7 is a flowchart illustrating the flow of a process, performed in an on-vehicle recording apparatus according to a second embodiment, related to an access to captured image data performed by a communication terminal.

FIG. 7 is a flowchart illustrating the flow of a process, performed in the on-vehicle recording apparatus 10 according to the second embodiment, related to an access to the captured image data 300 performed by the communication terminal 400. In also the on-vehicle recording apparatus 10 according to the second embodiment, in the process related to the connection with the communication terminal 400, first, it is determined whether or not a connection request has been received from the communication terminal 400 (Step S201). As a result of this determination, if the connection request is not received from the communication terminal 400 (No at Step S201), the process related to the connection with the communication terminal 400 is completed, and, the process is started again from Step S201 when the process related to this connection is again called.

In contrast, if it is determined that the connection request has been received from the communication terminal 400 (Yes at Step S201), a connection with the communication terminal 400 via the communication unit 250 is established, and it is determined whether or not the communication terminal 400 in which the connection has been established is the communication terminal 400 that has been registered in advance (Step S202).

As a result of this determination, if it is determined that the communication terminal 400 in which the connection has been established is the registered terminal 410 that is the communication terminal 400 that has been registered in advance (Yes at Step S202), an access to each of the normal recording data 310 and the event recording data 320 is permitted (Step S203).

In contrast, if it is determined that the communication terminal 400 in which the connection has been established is not the registered terminal 410 that has been registered in advance (No at Step S202), an access to the most recent event recording data 320a is permitted (Step S211). That is, in the case where the communication terminal 400 in which the connection has been established is the unregistered terminal 420 that is the communication terminal 400 that has not been registered in advance, regarding an access from the unregistered terminal 420 to the captured image data 300 that is stored in the recording unit 220, the access control unit 127 does not permit an access to the normal recording data 310 and the event recording data 320 that is not the most recent event recording data, and permits an access to the most recent event recording data 320a.

An example of a case in which a plurality of the event recording data 320 are stored includes a case in which, in addition to an event caused by an accident, the event detecting unit 125 sometimes detects acceleration that has occurred caused by a sudden braking as an event even if the acceleration is not caused by an accident. Furthermore, an example of a case in which a third party needs to check the event recording data 320 by using the unregistered terminal 420 includes a case in which the third party checks the event recording data immediately after an occurred accident on the basis of the accident. Accordingly, for example, in the case where the plurality of pieces of event recording data 320 are stored in the recording unit 220, the access control unit 127 does not permit the unregistered terminal 420 to access the event recording data 320 other than the most recent event recording data 320a, and permits the unregistered terminal 420 to access only the most recent event recording data 320a. As a result, the unregistered terminal 420 in which the connection has been established is not able to access, in addition to the normal recording data 310, the event recording data 320 that is not the most recent event recording data 320a but is able to access the most recent event recording data 320a. Accordingly, in the case where a connection between the on-vehicle recording apparatus 10 and the unregistered terminal 420 has been established, it is possible for the unregistered terminal 420 in which the connection has been established to check only the most recent event recording data 320a.

In this way, after the access to the captured image data 300 is limited in accordance with the communication terminal 400 in which the connection has been established, it is determined whether or not the connection of the communication terminal 400 has been completed (Step S205). As a result of this determination, if it is determined the connection of the communication terminal 400 has not been completed (No at Step S205), the state in which the access is permitted at Step S203 or Step S211 is maintained, and the determination whether or not the connection of the communication terminal 400 has been completed is repeated. In contrast, if it is determined that the connection of the communication terminal 400 has been completed (Yes at Step S205), the process related to a connection with the communication terminal 400 is completed, and, the process is started again from Step S201 when the process related to this connection is again called.

<Effects>

As described above, in the second embodiment, in the case where the access control unit 127 receives a connection request from the unregistered terminal 420, the access control unit 127 does not permit the unregistered terminal 420 to access, in addition to the normal recording data 310, the event recording data 320 that is not the most recent event recording data 320a, and permits the unregistered terminal 420 to access the most recent event recording data 320a. As a result, even in the case where the plurality of pieces of event recording data 320 are stored in the recording unit 220, it is possible to prevent the event recording data 320 other than the most recent event recording data 320a from being able to be checked by a third party by using the unregistered terminal 420. Therefore, it is possible to prevent an event occurred in the vehicle in the past from being unintentionally found out by the third party, and it is thus possible to more reliably protect privacy of the user.

In contrast, an access from the unregistered terminal 420 to the most recent event recording data 320a is allowed, so that it is possible for a third party to easily check, by using the unregistered terminal 420, the most recent event recording data 320a that has been recorded at the time of the occurrence of an event, such as an accident occurred in the vehicle. As a result, it is possible to easily check the cause of the occurrence of the event, such as the most recent accident, by using the unregistered terminal 420. As a result, it is possible to check the information on the event while ensuring protection of the privacy.

Third Embodiment

The on-vehicle recording apparatus 10 according to a third embodiment has substantially the same configuration as that of the on-vehicle recording apparatus 10 according to the second embodiment, but one feature of the third embodiment is that an access to the most recent event recording data 320a is permitted to the unregistered terminal 420 only within a predetermined time period after an event has been detected. The other configurations are the same as those described in the second embodiment; therefore, descriptions thereof will be omitted and the same reference numerals are assigned.

In the on-vehicle recording apparatus 10 according to the third embodiment, in the case where the access control unit 127 included in the control device 100 receives a connection request from the unregistered terminal 420 within a predetermined time period after an event has been detected by the event detecting unit 125, the access control unit 127 permits the unregistered terminal 420 to access the most recent event recording data 320a. Furthermore, in the case where the predetermined time period is exceeded after an event has been detected by the event detecting unit 125, if the access control unit 127 receives a connection request from the unregistered terminal 420, the access control unit 127 does not permit the unregistered terminal 420 to access the most recent event recording data 320a. The predetermined time period in this case is set in advance and stored in, for example, the internal memory included in the control device 100.

That is, in the third embodiment, unlike the second embodiment, a period of time for which the unregistered terminal 420 is able to access the most recent event recording data 320*a* is limited. Accordingly, in the third embodiment, the unregistered terminal 420 is able to access the most recent event recording data 320*a* only within the predetermined time period after the event has been detected by the event detecting unit 125. In other words, in the case where the predetermined time period is exceeded after the event has been detected by the event detecting unit 125, the unregistered terminal 420 is not able to access all of the pieces of captured image data 300 including the most recent event recording data 320*a* that are stored in the recording unit 220.

For example, in the case where a connection between the on-vehicle recording apparatus 10 and the unregistered terminal 420 has been established, if the connection between the on-vehicle recording apparatus 10 and the unregistered terminal 420 is within the predetermined time period after the event has been detected by the event detecting unit 125, presence or absence of the most recent event recording data 320*a* is displayed, and the unregistered terminal 420 is allowed to replay the most recent event recording data 320*a*. In contrast, if the connection between the on-vehicle recording apparatus 10 and the unregistered terminal 420 exceeds the predetermined time period after the event has been detected by the event detecting unit 125, the unregistered terminal 420 is not permitted to access the captured image data 300 including the most recent event recording data 320*a*.

In other words, in the case where the predetermined time period is set to, for example, five minutes, if an access is within five minutes after the event has been detected by the event detecting unit 125, the access control unit 127 permits the unregistered terminal 420 to access the most recent event recording data 320*a*, and, if an access exceeds five minutes, the access control unit 127 does not allow the unregistered terminal 420 to access the captured image data 300.

Furthermore, even if the access is within the predetermined time period after the event has been detected by the event detecting unit 125, it is preferable to set the unregistered terminal 420 such that only replay of the most recent event recording data 320*a* is permitted and download of the most recent event recording data 320*a* is not allowed.

Figure 8:
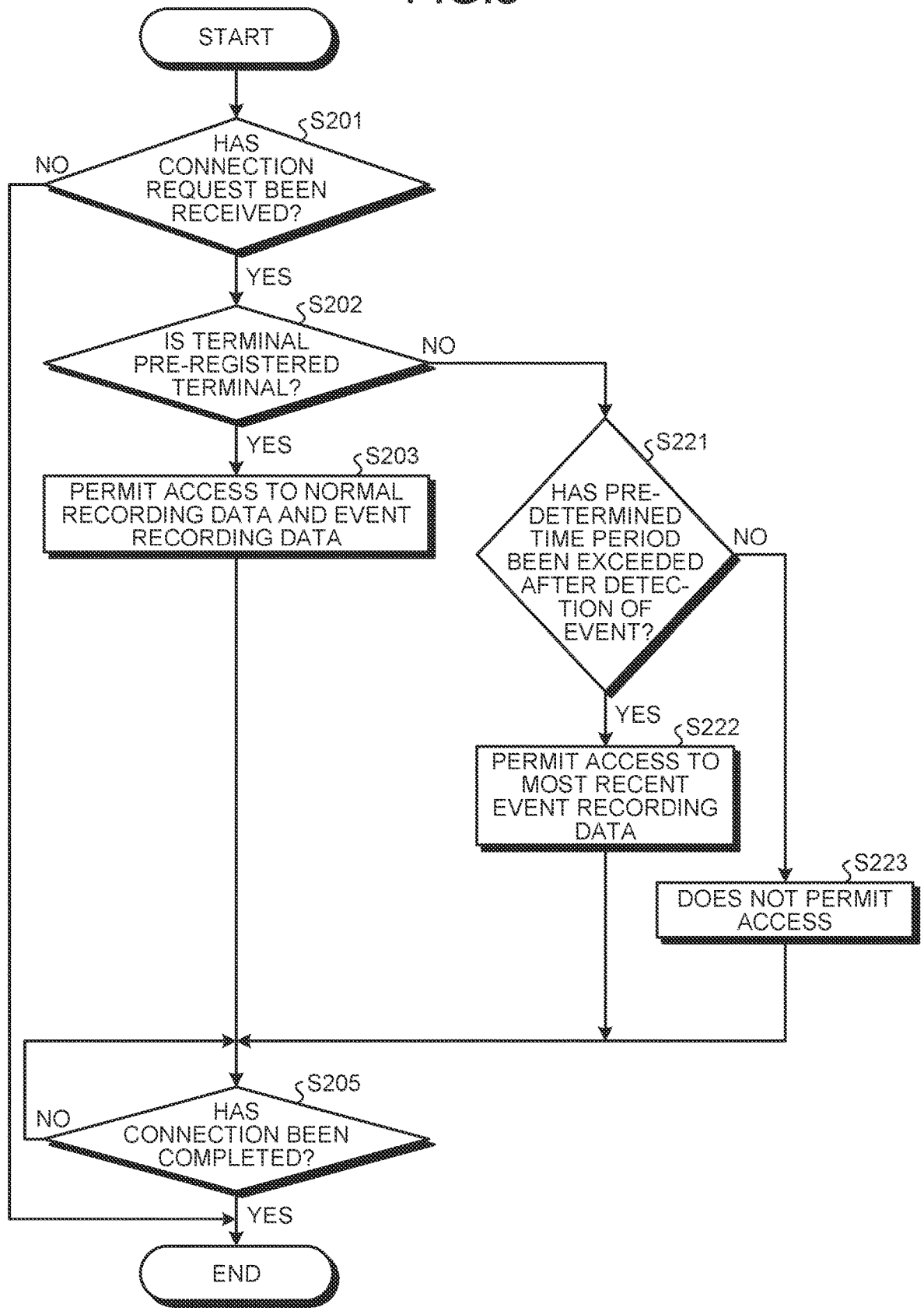
FIG. 8 is a flowchart illustrating the flow of a process, performed in an on-vehicle recording apparatus according to a third embodiment, related to an access to captured image data performed by a communication terminal.

FIG. 8 is a flowchart illustrating the flow of the process, performed in the on-vehicle recording apparatus 10 according to the third embodiment, related to an access to the captured image data 300 performed in the communication terminal 400. In the on-vehicle recording apparatus 10 according to the third embodiment, if it is determined that the communication terminal 400 in which the connection has been established is not the registered terminal 410 that has been registered in advance (No at Step S202), it is determined whether or not the predetermined time period is not exceeded after the event has been detected (Step S221). Specifically, in the case where the communication terminal 400 in which the connection has been established is the unregistered terminal 420 that is the communication terminal 400 that has not been registered in advance, first, the control device 100 determines whether or not the predetermined time period that is set in advance is not exceeded after the event has been detected by the event detecting unit 125.

As a result of this determination, if it is determined that the predetermined time period is not exceeded after the detection of the event (Yes at Step S221), an access to the most recent event recording data 320*a* is permitted (Step S222). That is, if it is determined that the predetermined time period that is set in advance is not exceeded after the event has been detected by the event detecting unit 125, the access control unit 127 permits the unregistered terminal 420 to access only the most recent event recording data 320*a* from among the pieces of captured image data 300 stored in the recording unit 220.

In contrast, if it is determined that the predetermined time period exceeds after the event has been detected (No at Step S221), an access performed by the unregistered terminal 420 is not permitted (Step S223). That is, regarding an access to the captured image data 300 stored in the recording unit 220 performed by the unregistered terminal 420, the access control unit 127 does not permit the unregistered terminal 420 to access all of the pieces of captured image data 300 including the most recent event recording data 320*a*.

As described above, if the access to the captured image data 300 is limited in accordance with the communication terminal 400 in which the connection has been established, the state in which the access is permitted at Step S203 or Step S222, or, the state in which the access is not permitted at Step S223 is maintained until it is determined that the connection of the communication terminal 400 has been completed (Yes at Step S205), the process of determining whether or not the connection of the communication terminal 400 has been completed (Step S205) is repeated.

<Effects>

As described above, in the third embodiment, in the case where the access control unit 127 receives a connection request from the unregistered terminal 420 within the predetermined time period after the event has been detected by the event detecting unit 125, the access control unit 127 permits the unregistered terminal 420 to access the most recent event recording data 320*a*, and, if the predetermined time period is exceeded, the access control unit 127 does not permit the unregistered terminal 420 to access the most recent event recording data 320*a*. As a result, in the case where a long time has elapsed after the occurrence of the event, such as an accident occurred in the vehicle, it is also possible to prevent the most recent event recording data 320*a* from being able to be checked by a third party using the unregistered terminal 420. Therefore, it is possible to prevent an event that occurred a long time ago from being unintentionally found out by the third party after the event, and it is possible to more reliably protect privacy of the user.

Furthermore, after the event has been detected by the event detecting unit 125, and after a third party checks the most recent event recording data 320*a* by using the unregistered terminal 420 within the predetermined time period, it is possible to prevent the most recent event recording data 320*a* from being checked by a different third party by using the unregistered terminal 420. That is, in the case where the predetermined time period is exceeded after the event has been detected, an access to the most recent event recording data 320*a* performed in the unregistered terminal 420 is not permitted, so that it is possible to prevent the most recent event recording data 320*a* from being able to be checked by a plurality of third parties by accessing the most recent event recording data 320*a* at different timings using the unregistered terminal 420. As a result, it is possible to limit the number of third parties capable of checking the most recent event recording data 320*a* by using the unregistered terminal 420, and it is possible to prevent an event, such as an accident occurred in the vehicle, from being found out by a lot of third parties, so that it is possible to more reliably protect privacy of the user.

In contrast, the access to the most recent event recording data 320*a* is allowed for the unregistered terminal 420 within the predetermined time period after the event has been detected, so that a third party is able to easily check, by using the unregistered terminal 420, the most recent event recording data 320a recorded at the time of the occurrence of the event as long as the predetermined time period is not exceeded. As a result, is it possible to easily check the cause of the occurred event within the predetermined time period after the occurrence of the event, such as an accident occurred in the vehicle, by using the unregistered terminal 420. As a result, it is possible to check the information on the event while ensuring protection of the privacy.

Fourth Embodiment

The on-vehicle recording apparatus 10 according to a fourth embodiment has substantially the same configuration as that of the on-vehicle recording apparatus 10 according to the first embodiment, but one feature of the fourth embodiment is that the communication terminal 400 is permitted to access the captured image data 300 stored in the recording unit 220 in the case where a vehicle is stopped. The other configurations are the same as those described in the first embodiment; therefore, descriptions thereof will be omitted and the same reference numerals are assigned.

Figure 9:
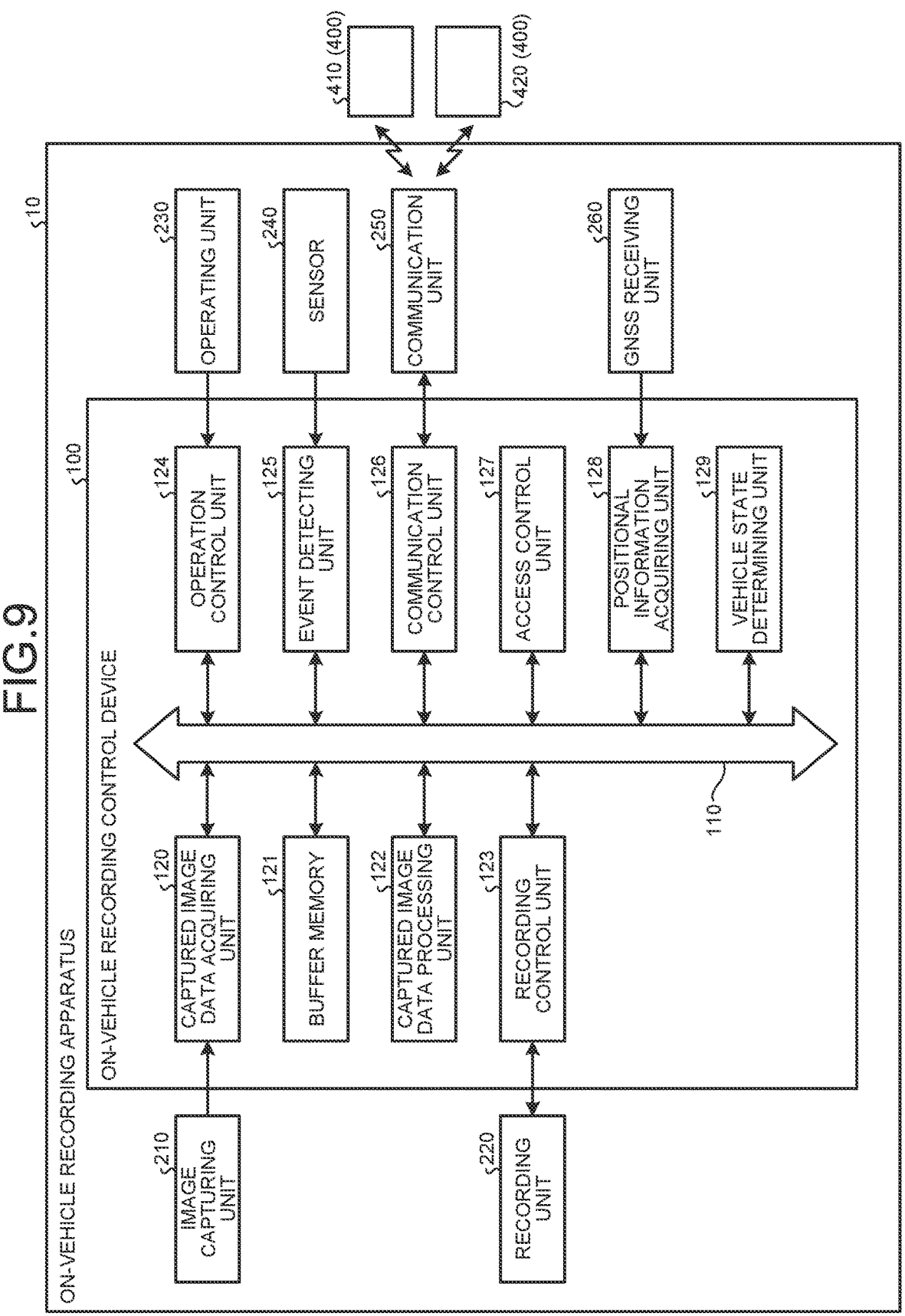
FIG. 9 is a block diagram illustrating an example of a configuration of an on-vehicle recording apparatus according to a fourth embodiment.

FIG. 9 is a block diagram illustrating an example of a configuration of the on-vehicle recording apparatus 10 according to the fourth embodiment. The control device 100 included in the on-vehicle recording apparatus 10 according to the fourth embodiment includes a vehicle state determining unit 129, in addition to the captured image data acquiring unit 120, the buffer memory 121, the captured image data processing unit 122, the recording control unit 123, the operation control unit 124, the event detecting unit 125, the communication control unit 126, the access control unit 127, and the positional information acquiring unit 128.

The vehicle state determining unit 129 is able to determine the state of the vehicle in which the on-vehicle recording apparatus 10 is installed, and, specifically, the vehicle state determining unit 129 is able to determine whether or not the vehicle is stopped. The vehicle state determining unit 129 determines whether or not the vehicle is stopped on the basis of a change in positional information on a vehicle output from the positional information acquiring unit 128 that acquires the positional information on the vehicle on the basis of an output from, for example, the GNSS receiving unit 260. That is, the vehicle state determining unit 129 determines that the vehicle is running if the positional information on the vehicle output from the positional information acquiring unit 128 is continuously changed. In contrast, if the positional information on the vehicle output from the positional information acquiring unit 128 is not changed in a certain time period, the vehicle state determining unit 129 determines that the vehicle is stopped.

In this way, in the on-vehicle recording apparatus 10 according to the fourth embodiment that includes the vehicle state determining unit 129, if the access control unit 127 determines, by using the vehicle state determining unit 129, that the vehicle is stopped, the access control unit 127 permits the unregistered terminal 420 to access the event recording data 320 stored in the recording unit 220. In contrast, if the vehicle state determining unit 129 determines that the vehicle is not stopped, the access control unit 127 does not permit the unregistered terminal 420 to access the event recording data 320.

Furthermore, the determination performed by the vehicle state determining unit 129 whether or not the vehicle is stopped may be performed by using other than the positional information on the vehicle that is output from the positional information acquiring unit 128. The vehicle state determining unit 129 may determine whether or not the vehicle is stopped on the basis of information on the running of the vehicle that is acquired from, for example, a Controller Area Network (CAN) included in the vehicle.

<Effects>

As described above, in the fourth embodiment, in the case where the vehicle state determining unit 129 determines that the vehicle is stopped, the access control unit 127 permits the unregistered terminal 420 to access the event recording data 320, so that it is possible to allow the unregistered terminal 420 to access the event recording data 320 only at the time of the occurrence of a big event.

In other words, the event detecting unit 125 detects an event on the basis of acceleration that is detected by the sensor 240, so that the event detecting unit 125 may also detect, as the event, an event other than an accident, such as a sudden braking applied while the vehicle is running. In this case, the vehicle is continuously running without stopping, but, in the case where the unregistered terminal 420 is able to access the event recording data 320 while the vehicle is running, a passenger other than the driver of the vehicle is able to check the event recording data 320 related to such an event other than the accident by using the unregistered terminal 420. As a result, it is possible for a third party to check the event recording data 320 other than the big event, such as an accident occurred in the vehicle, by using the unregistered terminal 420, so that it may be difficult to protect the privacy of the user.

In contrast, in the case where the vehicle state determining unit 129 determines that the vehicle is stopped, if the vehicle state determining unit 129 permits the unregistered terminal 420 to access the event recording data 320, the unregistered terminal 420 is able to check the event recording data 320 only when it is difficult to travel due to an accident or only at the time of an occurrence of a big event that requires the vehicle to be stopped. As a result, a third party is not able to check the event recording data 320 at the time of detection of a small event, but is able to check the event recording data 320 by using the unregistered terminal 420 only at the time of an occurrence of a big event, such as a vehicle accident, so that the third party is able to check the cause of the occurrence of the event by using the unregistered terminal 420. As a result, it is possible to check the information on the event while more reliably ensuring protection of the privacy.

Fifth Embodiment

The on-vehicle recording apparatus 10 according to a fifth embodiment has substantially the same configuration as that of the on-vehicle recording apparatus 10 according to the first embodiment, but one feature of the fifth embodiment is that the communication unit 250 is able to perform communication with the communication terminal 400 by using a plurality of communication methods, and control is changed in accordance with the communication methods. The other configurations are the same as those described in the first embodiment; therefore, descriptions thereof will be omitted and the same reference numerals are assigned.

Figure 10:
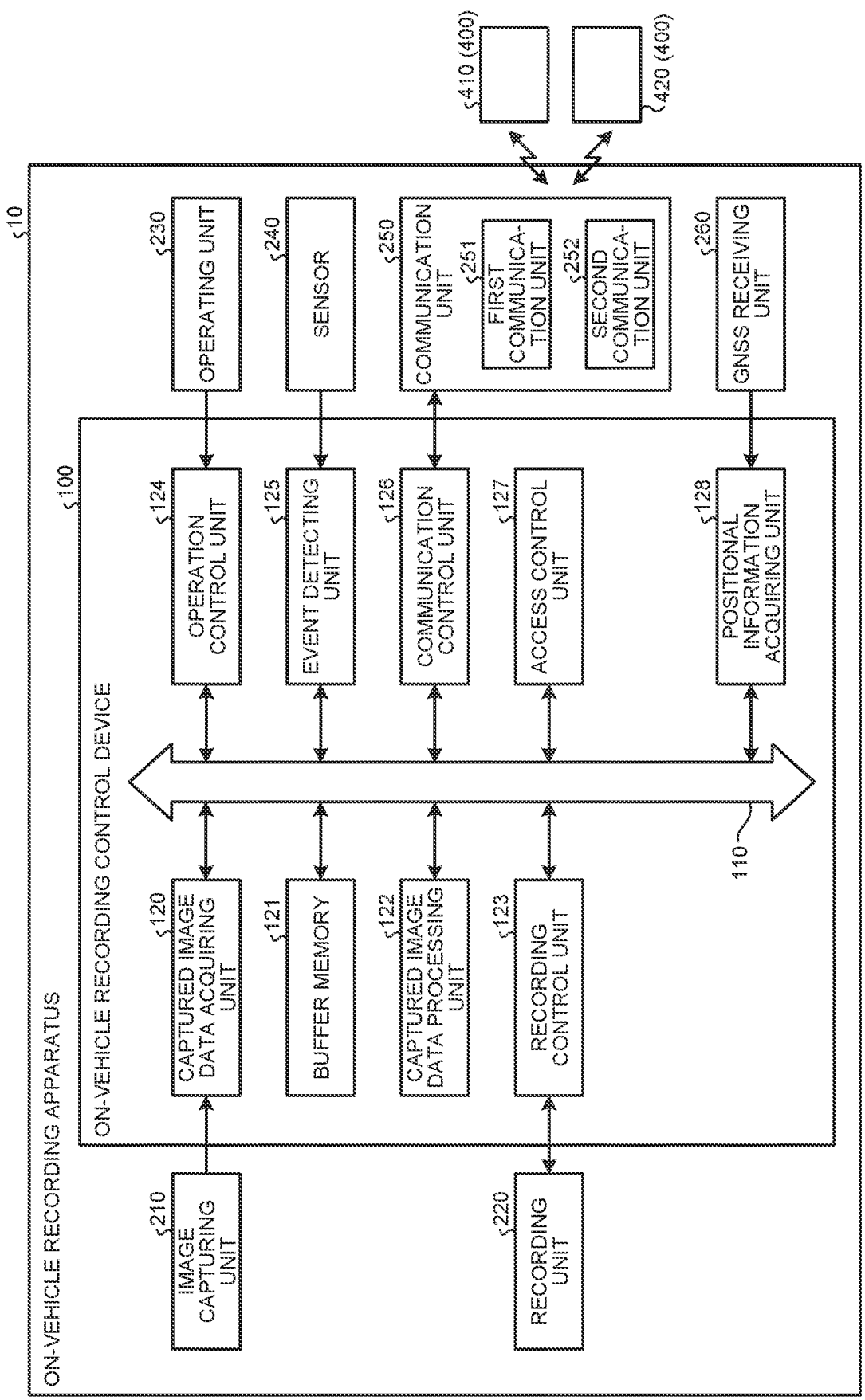
FIG. 10 is a block diagram illustrating an example of a configuration of an on-vehicle recording apparatus according to a fifth embodiment.

FIG. 10 is a block diagram illustrating an example of a configuration of the on-vehicle recording apparatus 10 according to the fifth embodiment. In the on-vehicle recording apparatus 10 according to the fifth embodiment, the communication unit 250 includes a first communication unit 251 and a second communication unit 252 each of which performs communication with the external communication terminal 400 by using a different communication method. The first communication unit 251 is able to perform communication with the communication terminal 400 by using a first communication method, and the second communication unit 252 is able to perform communication with the communication terminal 400 by using a second communication method that is different from the first communication method.

The first communication method that is the communication method used in the first communication unit 251 is able to establish a connection for communication with the communication terminal 400 in which an authentication check on communication has been performed. The authentication check on the communication is performed by using, for example, a password or the like, and, in the fifth embodiment, the first communication method is performed by using authenticated Wi-Fi (registered trademark), and Wi-Fi in an ad hoc mode is used for the communication. In contrast, the second communication method is able to establish a connection for communication as long as the communication terminal 400 performs communication using the second communication method. In the fifth embodiment, the second communication method is configured to use Bluetooth (registered trademark) and performs pairing by using, for example, near field communication (NFC). Furthermore, it may be possible to use a communication method other than Wi-Fi for the first communication method, and use a communication method other than Bluetooth for the second communication method.

The first communication method is the communication method for performing communication with only the communication terminal 400 in which an authentication check on communication has been performed; therefore, in order to perform communication between the communication terminal 400 and the on-vehicle recording apparatus 10 by using the first communication method, any of the communication terminal 400 needs to perform an operation for authentication to establish a connection by using the first communication method. In the fifth embodiment, once any of the communication terminal 400 has performed the operation for authentication to establish the connection by using the first communication method, the subsequent authentication for the corresponding communication terminal 400 to establish the connection using the first communication method is automatically performed.

Here, the registered terminal 410 is the communication terminal 400 that has been registered by performing an input operation related to the registration with respect to the operating unit 230. Accordingly, in the case where the communication terminal 400 that is used by a driver of a vehicle is registered as the registered terminal 410, it is conceivable that the registered terminal 410 performs an operation for authentication to establish the connection using the first communication method. That is, it is conceivable that the registered terminal 410 is used as the communication terminal 400 that is able to perform communication by using the first communication method. Accordingly, in the following, a description will be made under the assumption that the registered terminal 410 is also the communication terminal 400 that is able to perform communication by using the first communication method. In other words, the registered terminal 410 is a terminal that is held by an owner or a user of the on-vehicle recording apparatus 10 or the vehicle in which the on-vehicle recording apparatus 10 is installed.

In contrast, the second communication method that is the communication method used in the second communication unit 252 is able to establish a connection for communication as long as the communication terminal 400 performs communication by using the second communication method, so that, in the case where the unregistered terminal 420 is the communication terminal 400 that performs communication by using the second communication method, the unregistered terminal 420 is able to establish the connection for the communication by using the second communication method. Furthermore, in the case where the registered terminal 410 is the communication terminal 400 that performs communication by using the second communication method, the registered terminal 410 is also able to establish a connection for the communication by using the second communication method. In other words, the unregistered terminal 420 is a terminal held by an arbitrary third party and is a terminal other than the registered terminal 410.

For these reason described above, the communication control unit 126 that establishes the connection with the communication terminal 400 that performs communication with the communication unit 250 establishes the connection with the registered terminal 410 to be performed by using the first communication method used in the first communication unit 251 and the connection with at least the unregistered terminal 420 to be performed by using the second communication method used in the second communication unit 252.

Figure 11:
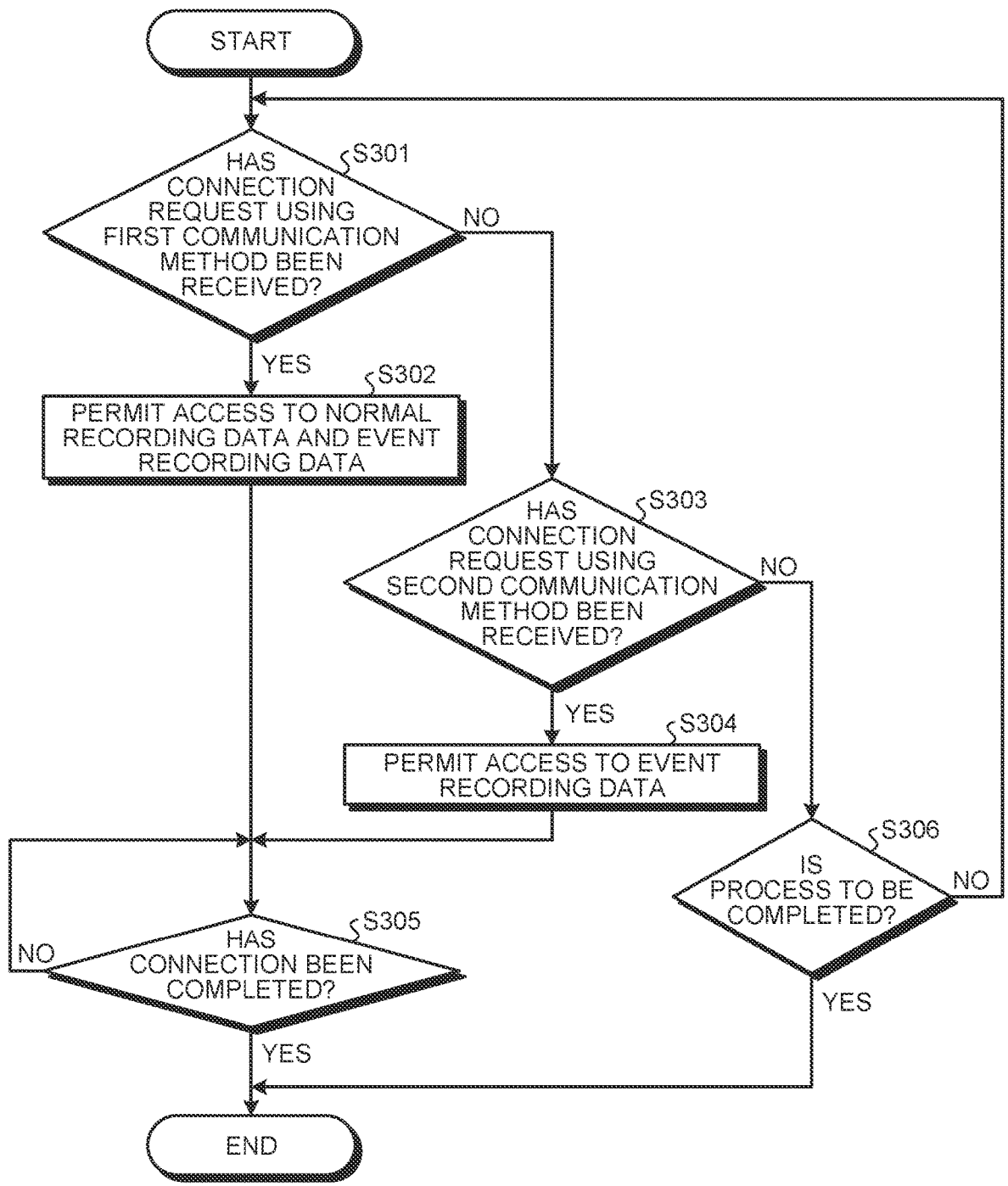
FIG. 11 is a flowchart illustrating the flow of a process, performed in an on-vehicle recording apparatus according to a fifth embodiment, related to an access to captured image data performed by a communication terminal.

FIG. 11 is a flowchart illustrating the flow of a process, performed in the on-vehicle recording apparatus 10 according to the fifth embodiment, related to the access to the captured image data 300 performed in the communication terminal 400. In the on-vehicle recording apparatus 10 according to the fifth embodiment, first, it is determined whether or not a connection request for a connection using the first communication method has been received from the communication terminal 400 (Step S301). Specifically, the control device 100 determines whether or not the communication control unit 126 that performs control of communication with the communication terminal 400 via the first communication unit 251 has received a connection request for a connection using the first communication method from the communication terminal 400. That is, it is determined whether or not the first communication unit 251 has received a signal for the connection request from the communication terminal 400.

As a result of this determination, if it is determined that the connection request for the connection using the first communication method has been sent from the communication terminal 400 to the communication control unit 126 or the first communication unit 251 (Yes at Step S301), the communication control unit 126 establishes the connection with the communication terminal 400 to be performed by using the first communication method. Furthermore, in this case, the access control unit 127 permits the communication terminal 400 in which the connection using the first communication method has been established to access the normal recording data 310 and the event recording data 320 (Step S302). That is, the access control unit 127 assumes that the communication terminal 400 in which the connection using the first communication method has been established is the registered terminal 410, and permits the subject communication terminal 400 to access all of the pieces of captured image data 300 stored in the recording unit 220. As a result, the communication terminal 400 in which the connection using the first communication method has been established is able to check the normal recording data 310 and the event recording data 320.

In contrast, if it is determined that the connection request for the connection using the first communication method is not sent from the communication terminal 400 to the communication control unit 126 or the first communication unit 251 (No at Step S301), it is determined whether or not a connection request for a connection using the second communication method is received from the communication terminal 400 (Step S303). Specifically, the control device 100 determines whether or not the connection request for the connection using the second communication method has been sent from the communication terminal 400 to the communication control unit 126 that performs control of communication with the communication terminal 400 via the second communication unit 252. In other words, it is determined whether or not the second communication unit 252 has received a signal for the connection request from the communication terminal 400.

As a result of this determination, if it is determined that the connection request for the connection using the second communication method has been sent from the communication terminal 400 to the communication control unit 126 or the second communication unit 252 (Yes at Step S303), the communication control unit 126 establishes a connection with the communication terminal 400 to be performed by using the second communication method. Furthermore, in this case, the access control unit 127 permits the communication terminal 400 in which the connection using the second communication method has been established to access the event recording data 320 (Step S304). That is, the access control unit 127 assumes that the communication terminal 400 in which the connection using the second communication method has been established is the unregistered terminal 420, and does not permit the communication terminal 400 to access the normal recording data 310 from among the pieces of captured image data 300 stored in the recording unit 220, and permits the communication terminal 400 to access the event recording data 320. As a result, the communication terminal 400 in which the connection using the second communication method has been established is able to check only the event recording data 320.

As described above, after the access to the captured image data 300 performed by the communication terminal 400 is limited in accordance with the communication method used at the time of establishment of a connection, then, it is determined whether or not the connection of the communication terminal 400 has been completed (Step S305). Specifically, the control device 100 determines whether or not the establishment of the connection between the communication terminal 400 and the communication control unit 126 via the communication unit 250 is continued.

As a result of this determination, if it is determined that establishment of the connection between the communication terminal 400 and the communication control unit 126 is continued and the connection of the communication terminal 400 is not completed (No at Step S305), the state in which the access is permitted at Step S302 or Step S304 is maintained, and the determination whether or not the connection of the communication terminal 400 has been completed is repeated.

In contrast, if it is determined that the connection between the communication terminal 400 and the communication control unit 126 has been completed and the connection of the communication terminal 400 has been completed (Yes at Step S305), the process related to the connection with the communication terminal 400 is completed, and, the process at Step S301 is again started when the process related to this connection is again called.

Furthermore, regarding these, if is determined that a connection request for a connection using the second communication method is not sent from the communication terminal 400 to the communication control unit 126 or the second communication unit 252 (No at Step S303), it is determined whether or not the process is to be completed (Step S306). That is, it is determined whether or not the operation of the on-vehicle recording apparatus 10 or control of communication with the communication terminal 400 is to be completed. As a result of this determination, if it is determined that the operation of the on-vehicle recording apparatus 10 or control of communication with the communication terminal 400 is not to be completed (No at Step S306), the process returns to Step S301, and again, it is determined whether or not a connection request for a connection using the first communication method is received.

In contrast, if it is determined that the operation of the on-vehicle recording apparatus 10 or control of communication with the communication terminal 400 is to be completed (Yes at Step S306), at least the process related to the connection with the communication terminal 400 is completed, and, the process at Step S301 is again started when the process related to this connection is again called.

<Effects>

As described above, in the fifth embodiment, control of the access to the captured image data 300 performed by the communication terminal 400 is limited in accordance with the communication method used at the time of establishment of the connection with the communication terminal 400, so that it is possible to more reliably perform access control. That is, as a result of the communication control unit 126 establishing the connection with the registered terminal 410 using the first communication method and the connection with at least the unregistered terminal 420 using the second communication method and performing access control in accordance with the communication methods, the unregistered terminal 420 is not allowed to access the normal recording data 310 is allowed to access to the event recording data 320 in a more reliable manner. As a result, it is possible to check the information on the event while more reliably ensuring protection of the privacy.

Modification of Fifth Embodiment

In addition, in the fifth embodiment, the registered terminal 410 is able to establish a connection using not only the first communication method but also the second communication method; therefore, it is conceivable to unintentionally establish a connection using the second communication method. Accordingly, it may be determined whether the communication terminal 400 connected using the second communication method is the registered terminal 410 or the unregistered terminal 420.

Figure 12:
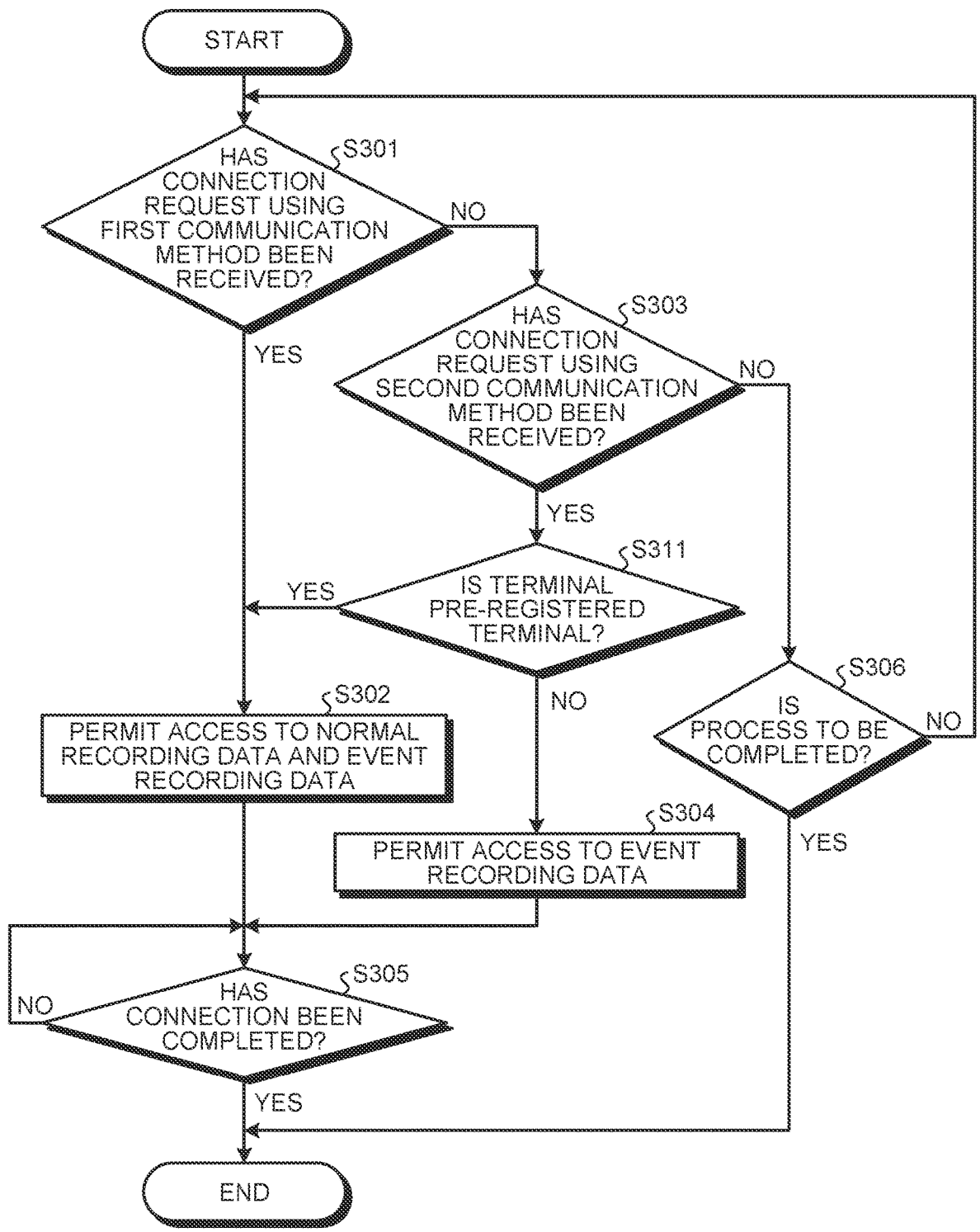
FIG. 12 is a flowchart illustrating the flow of a process, performed in an on-vehicle recording apparatus according to a modification of a fifth embodiment, related to an access to captured image data performed by a communication terminal.

FIG. 12 is a flowchart illustrating the flow of a process, performed in the on-vehicle recording apparatus 10 according to a modification of the fifth embodiment, related to an access to the captured image data 300 performed by the communication terminal 400. In the modification of the fifth embodiment, if it is determined that a connection request for a connection using the second communication method has been sent from the communication terminal 400 to the communication control unit 126 or the second communication unit 252 (Yes at Step S303), the communication control unit 126 establishes a connection with the communication terminal 400 to be performed by using the second communication method. Furthermore, the control device 100 determines whether or not the communication terminal 400 in which the connection using the second communication method has been established is the communication terminal 400 that has been registered in advance (Step S311). Specifically, the control device 100 determines, by using the communication control unit 126, whether or not the communication terminal 400 in which the connection using the second communication method has been established is the registered terminal 410 that has been registered in advance or is the unregistered terminal 420 that has not been registered in advance.

As a result of this determination, if it is determined that the communication terminal 400 in which the connection using the second communication method has been established is the registered terminal 410 that has been registered in advance (Yes at Step S311), an access to the normal recording data 310 and the event recording data 320 performed by the registered terminal 410 is permitted (Step S302). That is, if it is determined, by using the communication control unit 126, that the communication terminal 400 in which the connection using the second communication method has been established is the registered terminal 410, the access control unit 127 allows the registered terminal 410 to access the normal recording data 310 and the event recording data 320.

In contrast, if it is determined that the communication terminal 400 in which the connection using the second communication method has been established is not the registered terminal 410 that has been registered in advance (No at Step S311), the access control unit 127 controls the communication terminal 400 in which the connection using the second communication method has been established such that an access to the normal recording data 310 is not permitted and an access to the event recording data 320 is permitted (Step S304).

<Effects>

As described above, in the modification of the fifth embodiment, in the case where the communication terminal 400 in which the connection using the second communication method has been established is the registered terminal 410, the registered terminal 410 is allowed to access each of the normal recording data 310 and the event recording data 320, so that it is possible to improve usability. That is, the registered terminal 410 is able to connect the communication unit 250 using not only the first communication method but also the second communication method, so that the connection may possibly be established using the second communication method. Even in this case, by determining whether or not the communication terminal 400 in which the connection using the second communication method has been established is the registered terminal 410, it is possible to avoid a situation in which the registered terminal 410 is not able to access the normal recording data 310. As a result, it is possible to improve reliability at the time of a check of the information on the event while more reliably ensuring protection of the privacy.

Sixth Embodiment

The on-vehicle recording apparatus 10 according to a sixth embodiment has substantially the same configuration as that of the on-vehicle recording apparatus 10 according to the fifth embodiment, but one feature of the sixth embodiment is that, after a connection request for a connection using the second communication method has been received, an access to the event recording data 320 is permitted only within a predetermined time period after detection of an event. The other configurations are the same as those described in the fifth embodiment; therefore, descriptions thereof will be omitted and the same reference numerals are assigned.

In the on-vehicle recording apparatus 10 according to the sixth embodiment, the access control unit 127 included in the control device 100 permits the communication terminal 400 in which the connection using the second communication method has been established to access the event recording data 320 within a predetermined time period after the event detecting unit 125 has detected an event. In the case where a predetermined time period is exceeded after the event detecting unit 125 has detected the event, the access control unit 127 does not permit the communication terminal 400 in which the connection using the second communication method has been established to access the event recording data 320. The predetermined time period in this case is set in advance and is stored in, for example, the internal memory included in the control device 100.

Namely, in the sixth embodiment, unlike the fifth embodiment, an accessible time period is limited for the access to the event recording data 320 performed by the communication terminal 400 in which the connection using the second communication method has been established. Accordingly, in the sixth embodiment, the communication terminal 400 in which the connection using the second communication method has been established is able to access the event recording data 320 only within the predetermined time period after the event detecting unit 125 has detected the event. In other words, after the event has been detected by the event detecting unit 125, if the predetermined time period is exceeded, the communication terminal 400 in which the connection using the second communication method has been established is not able to access all of the pieces of captured image data 300 stored in the recording unit 220 including the event recording data 320.

Figure 13:
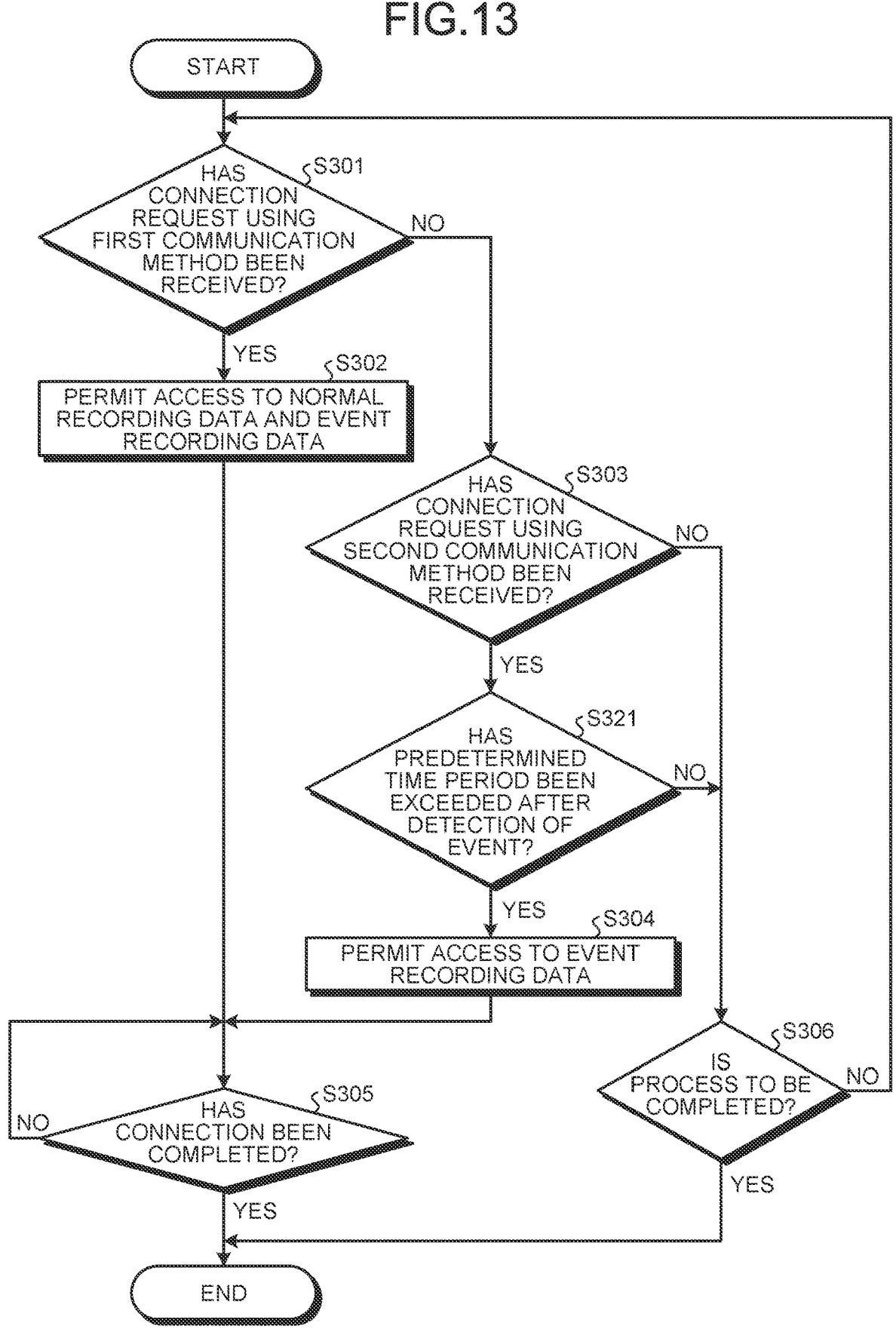
FIG. 13 is a flowchart illustrating the flow of a process, performed in an on-vehicle recording apparatus according to a sixth embodiment, related to an access to captured image data performed by a communication terminal.

FIG. 13 is a flowchart illustrating the flow of a process, performed in the on-vehicle recording apparatus 10 according to the sixth embodiment, related to the access to the captured image data 300 performed by the communication terminal 400. In the sixth embodiment, if it is determined that a connection request for a connection using the second communication method is sent from the communication terminal 400 to the communication control unit 126 or the second communication unit 252 (Yes Step S303), it is determined whether or not the time period is within the predetermined time period after the detection of the event (Step S321). Specifically, in the case where a connection between the second communication unit 252 and the communication terminal 400 has been established by using the second communication method, first, the control device 100 determines whether or not the predetermined time period is not exceeded after the event has been detected by the event detecting unit 125.

As a result of this determination, if it is determined that the predetermined time period is not exceeded after the detection of the event (Yes at Step S321), the access control unit 127 permits the communication terminal 400 in which the connection using the second communication method has been established to access the event recording data 320 (Step S304). That is, if it is determined that the predetermined time period is not exceeded after the detection of the event, the access control unit 127 assumes that the communication terminal 400 in which the connection using the second communication method has been established is the unregistered terminal 420, and allows the subject communication terminal 400 not to access the normal recording data 310 and to access the event recording data 320.

In contrast, if it is determined that the predetermined time period is exceeded after the detection of the event (No at Step S321), it is determined whether or not the process is to be completed (Step S306). That is, it is determined whether or not the operation of the on-vehicle recording apparatus 10 or control of communication with the communication terminal 400 is to be completed.

<Effects>

As described above, in the sixth embodiment, after the connection with the communication terminal 400 to be performed by using the second communication method has been established, the access control unit 127 permits an access to the event recording data 320 only within the predetermined time period after the event has been detected by the event detecting unit 125, and if the predetermined time period is exceeded, the access control unit 127 does not permit the access to the event recording data 320. As a result, in the case where a long time has elapsed after the occurrence of the event, such as an accident occurred in the vehicle, it is possible to prevent a third party from accessing the event recording data 320 by using the communication terminal 400 in which the connection using the second communication method has been established, that is, the unregistered terminal 420. Therefore, it is possible to prevent an event that occurred a long time ago from being unintentionally found out by the third party after the event, and it is possible to more reliably protect privacy of the user.

In contrast, the unregistered terminal 420 in which the connection using the second communication method has been established is able to access the event recording data 320 within the predetermined time period after the detection of the event, so that the third party is able to easily check, by using the unregistered terminal 420, the event recording data 320 that has been recorded at the time of the occurrence of the event as long as the predetermined time period is not exceeded. As a result, it is possible to easily check the cause of the occurrence of the event by using the unregistered terminal 420 in which the connection using the second communication method has been established as long as the predetermined time period is not exceeded after the occurrence of the event, such as an accident occurred in a vehicle. As a result, it is possible to check the information on the event while ensuring protection of the privacy.

Modification of Sixth Embodiment

In addition, in the sixth embodiment, the communication terminal 400 in which the connection using the second communication method has been established is permitted to access the event recording data 320 only within the predetermined time period after the event detecting unit 125 has detected the event, but, in this case, the event recording data 320 that is permitted to be accessed may be the most recent event recording data 320a. That is, the communication terminal 400 in which the connection using the second communication method has been established is not permitted to access the event recording data 320 that is not the most recent event recording data 320a even within the predetermined time period after the event detecting unit 125 has detected the event, and an access to only the most recent event recording data 320a may be permitted. As a result, even in a case in which a plurality of pieces of the event recording data 320 are stored in the recording unit 220, it is possible to prevent the event recording data 320 other than the most recent event recording data 320a from being able to be checked by a third party by using the communication terminal 400 in which the connection using the second communication method has been established. Therefore, it is possible to prevent an event occurred in the vehicle in the past from being unintentionally found out by the third party, and it is thus possible to more reliably protect privacy of the user.

Seventh Embodiment

The on-vehicle recording apparatus 10 according to a seventh embodiment has substantially the same configuration as that of the on-vehicle recording apparatus 10 according to the sixth embodiment, but one feature of the seventh embodiment is that a connection using the second communication method is approved only within a predetermined time period after detection of an event. The other configurations are the same as those described in the sixth embodiment; therefore, descriptions thereof will be omitted and the same reference numerals are assigned.

In the on-vehicle recording apparatus 10 according to the seventh embodiment, in a period of time for which the event detecting unit 125 does not detect an event, the communication control unit 126 does not establish a connection with the communication terminal 400 to be performed by using the second communication method, and enables establishment of a connection with the communication terminal 400 using the second communication method in a predetermined time period after the event detecting unit 125 has detected an event. In this case, the predetermined time period used in this case is set in advance and is stored in, for example, the internal memory included in the control device 100

In other words, in a period of time for which the event detecting unit 125 does not detect an event, the communication control unit 126 approves the connection of the communication terminal 400 to be performed using only the first communication method. Accordingly, in the period of time for which the event detecting unit 125 does not detect an event, the communication control unit 126 practically approves only the connection of the registered terminal 410 and does not approve the connection of the unregistered terminal 420.

Figure 14:
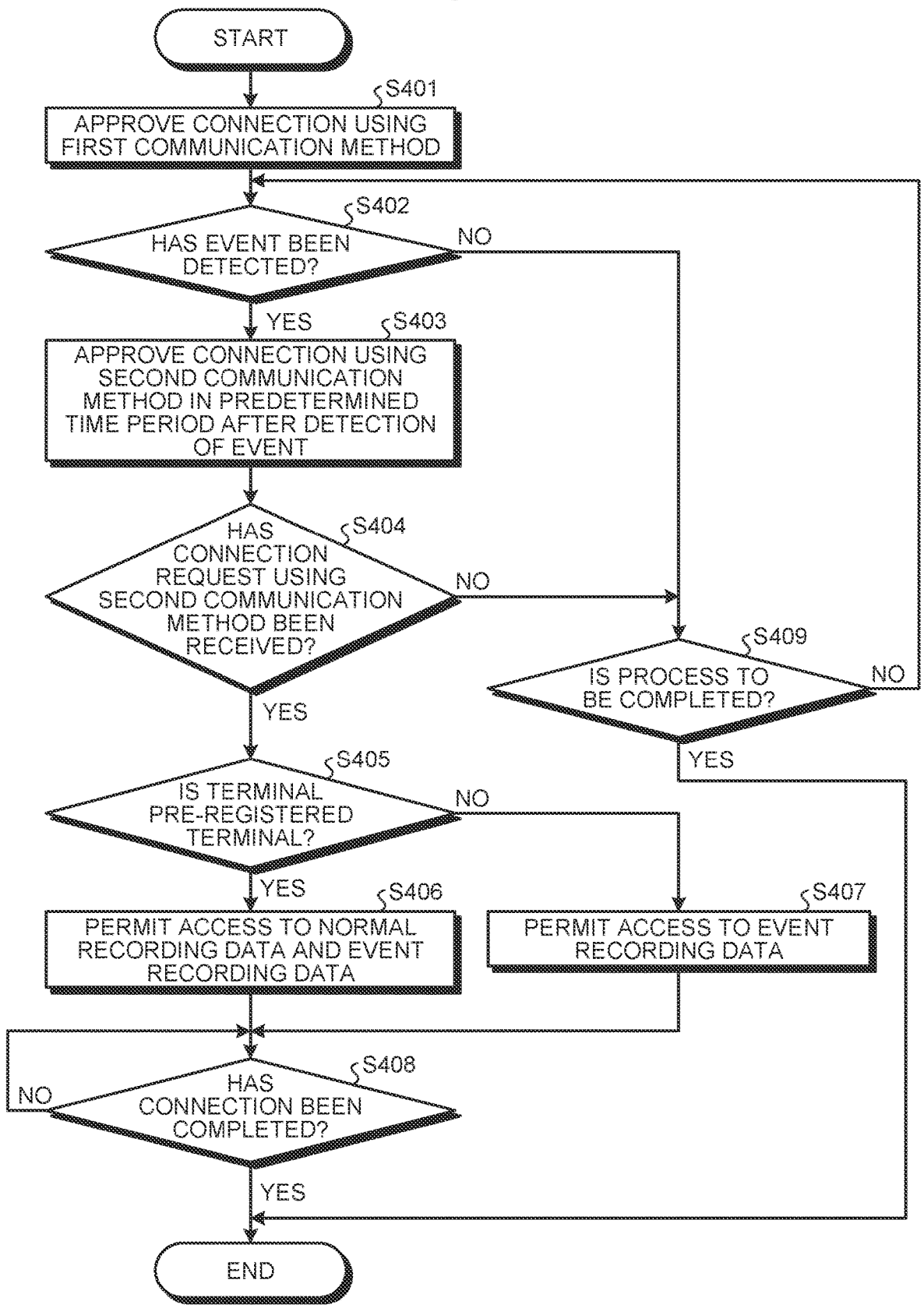
FIG. 14 is a flowchart illustrating the flow of a process, performed in an on-vehicle recording apparatus according to a seventh embodiment, related to an access to captured image data performed by a communication terminal.

FIG. 14 is a flowchart illustrating a process, performed in the on-vehicle recording apparatus 10 according to the seventh embodiment, related to an access to the captured image data 300 performed by the communication terminal 400. In the on-vehicle recording apparatus 10 according to the seventh embodiment, first, the connection using the first communication method is approved (Step S401). As a result, practically, a connection of the unregistered terminal 420 is not approved, and only a connection of the registered terminal 410 that has been registered in advance is approved.

Then, it is determined whether or not an event occurred in a vehicle has been detected by the event detecting unit 125 (Step S402). That is, the event detecting unit 125 detects an occurrence of an event based on whether or not acceleration detected by the sensor 240 is equal to or larger than the threshold that is set in advance.

If the event detecting unit 125, which detects an event on the basis of the acceleration detected by the sensor 240 in this way, detects an occurrence of an event in the vehicle (Yes at Step S402), the control device 100 approves a connection using the second communication method in a predetermined time period after the detection of the event (Step S403). As a result, the communication terminal 400 including the unregistered terminal 420 that are able to establish a connection using the second communication method are allowed to be able to establish a connection using the second communication method.

Then, it is determined whether or not a connection request for a connection using the second communication method has been received from the communication terminal 400 (Step S404). That is, it is determined whether or not the second communication unit 252 that performs communication with the communication terminal 400 using the second communication method has received a signal for the connection request from the communication terminal 400.

As a result of this determination, if it is determined that the connection request for the connection using the second communication method has been received from the communication terminal 400 (Yes at Step S404), the communication control unit 126 establishes the connection with the communication terminal 400 using the second communication method. Furthermore, the control device 100 determines whether or not the communication terminal 400 in which the connection using the second communication method has been established is the communication terminal 400 that has been registered in advance (Step S405). That is, the control device 100 determines whether the communication terminal 400 in which the connection using the second communication method has been established is the registered terminal 410 that has been registered in advance or the unregistered terminal 420 that has not been registered in advance.

As a result of this determination, if it is determined that the communication terminal 400 in which the connection using the second communication method has been established is the registered terminal 410 that has been registered in advance (Yes at Step S405), the access control unit 127 permits the registered terminal 410 to access the normal recording data 310 and the event recording data 320 (Step S406).

In contrast, if it is determined that the communication terminal 400 in which the connection using the second communication method has been established is not the registered terminal 410 that has not been registered in advance (No at Step S405), the access control unit 127 does not permit the communication terminal 400 in which the connection using the second communication method to access the normal recording data 310, and permits the communication terminal 400 to access the event recording data 320 (Step S407).

As described above, if an access to the captured image data 300 to be performed by the communication terminal 400 is limited depending on whether or not the communication terminal 400 in which the connection using the second communication method has been established is the registered terminal 410 that has been registered in advance, then, it is determined whether or not the connection of the communication terminal 400 has been completed (Step S408). Specifically, the control device 100 determines whether or not the establishment of the connection between the communication terminal 400 and the communication control unit 126 via the communication unit 250 is continued.

As a result of this determination, if it is determined that the establishment of the connection between the communication terminal 400 and the communication control unit 126 is continued and if it is determined that the connection of the communication terminal 400 has not been completed (No at Step S408), the state in which the access is permitted at Step S406 or Step S407 is maintained, and determination whether or not the connection of the communication terminal 400 has been completed is repeated.

In contrast, if it is determined that the connection between the communication terminal 400 and the communication control unit 126 has been completed and if it is determined that the connection of the communication terminal 400 has been completed (Yes at Step S408), the process related to the connection with the communication terminal 400 is completed, and, the process is again started from Step S401 when the process related to this connection is again called.

Furthermore, in contrast, in the case where the event detecting unit 125 does not detect an occurrence of an event with respect to the vehicle (No at Step S402) or in the case where it is determined that a connection request for a connection using the second communication method has not been received from the communication terminal 400 (No at Step S404), it is determined whether or not the process is to be completed (Step S409). That is, it is determined whether or not the operation of the on-vehicle recording apparatus 10 or control of communication with the communication terminal 400 is to be completed. As a result of this determination, if it is determined that the operation of the on-vehicle recording apparatus 10 or control of communication with the communication terminal 400 is not to be completed (No at Step S409), the process returns to Step S402, and it is determined whether or not an event with respect to the vehicle has been detected.

In contrast, if it is determined that the operation of the on-vehicle recording apparatus 10 or control of the communication with the communication terminal 400 is to be completed (Yes at Step S409), at least the process related to the connection with the communication terminal 400 is completed, and, the process is again started from Step S401 when the process related to this connection is again called.

<Effects>

As described above, in the seventh embodiment, the establishment of the connection with the communication terminal 400 using the second communication method is enabled only within the predetermined time period after the event detecting unit 125 has detected the event, so that, in the case where an event is not detected, it is possible to prevent establishment of the connection with the communication terminal 400 using the second communication method. In other words, in the case where the event detecting unit 125 does not detect an event, practically, it is possible to enable only the establishment of the connection with the registered terminal 410 using the first communication method, and prohibit establishment of the connection with the unregistered terminal 420 using the second communication method. As a result, in a situation in which an event, such as an accident occurred in a vehicle, does not occur, it is possible to prevent the connection of the unregistered terminal 420 using the second communication method from being established, and prevent a third party from accessing the event recording data 320 by using the unregistered terminal 420. Therefore, in a situation in which an event does not occur, it is possible to prevent the event recording data 320 from being unintentionally checked by the third party, and it is thus possible to more reliably protect privacy of the user.

In contrast, the establishment of the connection with the communication terminal 400 using the second communication method is enabled within the predetermined time period after the detection of the event, so that it is possible to establish the connection of the unregistered terminal 420 using the second communication method as long as the predetermined time period is not exceeded after the detection of the event, and it is possible for the third party to check the event recording data 320 that has been recorded at the time of occurrence of the event by using the unregistered terminal 420. As a result, it is possible to easily check the cause of the occurrence of the event by using the unregistered terminal 420 as long as the predetermined time period is not exceeded after the occurrence of the event, such as a vehicle accident. As a result, it is possible to check the information on the event while ensuring protection of the privacy.

Furthermore, in the first to the seventh embodiments described above, a case has been illustrated in the drawings as an example in which, regarding the captured image data 300 that is stored as the event recording data 320 at the time of detection of the event, a single piece of the captured image data 300 is stored as the event recording data 320 at the time of single detection of an event; however, a plurality of pieces of the captured image data 300 may be stored as the event recording data 320 at the time of single detection of an event.

Other Embodiment

In addition to the embodiments described above, the on-vehicle recording apparatus 10 according to the present embodiment may be performed with various kinds of embodiments. For example, in the case where a connection with the unregistered terminal 420 has been established, the access control unit 127 included in the control device 100 may allow an access to the event recording data indicating that acceleration at the time of detection of an event is equal to or larger than a predetermined value from among the most recent event recording data, such as the event recording data that is stored five minutes before, for example, the establishment of the connection. The predetermined value that is set in this case is a value that indicates a level apparently generated in a vehicle caused by a collision or the like. In the case where the connection with the unregistered terminal 420 has been established, the access control unit 127 included in the control device 100 may allow an access to the event recording data indicating that acceleration at the time of detection of an event is the maximum from among the most recent event recording data, such as the event recording data that is stored five minutes before, for example, the establishment of the connection. By performing the process in this way, it is possible for a third party to check the event recording data related to an accident by using the unregistered terminal 420 even if the event recording data has been stored as a result of acceleration being applied to the vehicle before and after the accident.

In the above, the on-vehicle recording apparatus 10 according to the present embodiment has been described; however, an embodiment may also be implemented with various kinds of embodiments other than the first to the seventh embodiments described above.

Each of the components included in the on-vehicle recording apparatus 10 illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

The configuration of the on-vehicle recording apparatus 10 is implemented as, for example, software, programs, or the like loaded in a memory. In the embodiments described above, the description has been given as the functional blocks that are implemented in cooperation with these pieces of hardware or software. In other words, the functional blocks can be implemented in various forms by using only hardware, using only software, or using a combination of hardware and software.

The components described above include one that can easily be thought of by a person skilled in the art and one that is practically identical. Further, the configurations described above may be combined appropriately. Furthermore, various omissions, replacements, and modifications of the components may be made within the scope of the present embodiments.

In the above description, a case in which a loop recording process is performed has been described; however, the same applies to a case in which image capturing is started after detection of an event.

In the above description, a case has been described as an example in which the image capturing unit 210 is arranged in the vicinity of the front window in the room of the vehicle and mainly captures an image of the surroundings in front of the vehicle; however, the image capturing unit 210 is not limited to this example, and may be arranged in the vicinity of the rear window of the vehicle facing rearward, and mainly capture an image of the surroundings in rear of the vehicle. Alternatively, image capturing unit 210 may be a camera capable of capturing a 360-degree image, or may be a group constituted from a plurality of cameras each capturing an image in a different direction.

INDUSTRIAL APPLICABILITY

The on-vehicle recording apparatus, the on-vehicle recording control method, and the medium according to the present embodiment are able to use for, for example, a dashboard camera.

What is claimed is:
1. An on-vehicle recording apparatus comprising:
a captured image data acquiring unit that acquires captured image data captured by an image capturing unit that captures an image of surroundings of a vehicle, the captured image data being a video image;
an event detecting unit that detects an event based on an accident occurred with respect to the vehicle;
a recording control unit that stores the captured image data acquired by the captured image data acquiring unit as normal recording data that is not based on the event and as event recording data that is based on the event;
a communication control unit that establishes a connection with a communication terminal; and
an access control unit
that, when the communication terminal is a registered terminal that is the communication terminal that has been registered in advance, allows the registered terminal to access the normal recording data and the event recording data, and
that, when the communication terminal is an unregistered terminal that is the communication terminal that has not been registered in advance, does not allow the unregistered terminal to access the normal recording data and allows the unregistered terminal to access the event recording data,
the connection with the communication terminal being established by the communication control unit receiving a connection request after the event is detected by the event detecting unit,
wherein, when a connection request is received from the unregistered terminal, the access control unit permits the unregistered terminal to access the event recording data that is most recent data, and does not permit the unregistered terminal to access other event recording data that is not most recent data.

2. The on-vehicle recording apparatus according to claim 1, wherein
the communication control unit establishes the connection with the registered terminal to be performed by using a first communication method, and the connection with at least the unregistered terminal to be performed by using a second communication method, and
when the communication terminal in which the connection has been established by the communication control unit using the second communication method is the registered terminal, the access control unit allows the registered terminal to access the normal recording data and the event recording data.

3. The on-vehicle recording apparatus according to claim 2, wherein the access control unit allows the communication terminal in which the connection has been established by using the second communication method to access the event recording data in a predetermined time period after the event detecting unit has detected the event.

4. The on-vehicle recording apparatus according to claim 2, wherein the communication control unit enables the establishment of the connection with the communication terminal to be performed by using the second communication method in a predetermined time period after the event detecting unit has detected the event.

5. The on-vehicle recording apparatus according to claim 2, wherein the access control unit permits the communication terminal in which the connection has been established by using the second communication method to access the event recording data that is the most recent data.

6. An on-vehicle recording control method comprising:
a captured image data acquiring step of acquiring captured image data captured by an image capturing unit that captures an image of surroundings of a vehicle, the captured image data being a video image;
an event detecting step of detecting an event based on an accident occurred with respect to the vehicle;
a recording controlling step of storing the captured image data acquired at the captured image data acquiring step as normal recording data that is not based on the event and as event recording data that is based on the event;
a communication controlling step of establishing a connection with a communication terminal; and
an access controlling step of,
when the communication terminal is a registered terminal that is the communication terminal that has been registered in advance, allowing the registered terminal to access the normal recording data and the event recording data, and
when the communication terminal is an unregistered terminal that is the communication terminal that has not been registered in advance, not allowing the unregistered terminal to access the normal recording data and allowing the unregistered terminal to access the event recording data,
the connection with the communication terminal being established by the communication controlling step based on a connection request that is received after the event is detected by the event detecting step,
wherein, when a connection request is received from the unregistered terminal, the access controlling step permits the unregistered terminal to access the event recording data that is most recent data, and does not permit the unregistered terminal to access other event recording data that is not most recent data.

7. A non-transitory computer readable recording medium storing therein a program that causes a computer operated as an on-vehicle recording control device to execute a process comprising:
a captured image data acquiring step of acquiring captured image data captured by an image capturing unit that captures an image of surroundings of a vehicle, the captured image data being a video image;
an event detecting step of detecting an event based on an accident occurred with respect to the vehicle;
a recording controlling step of storing the captured image data acquired at the captured image data acquiring step as normal recording data that is not based on the event and as event recording data that is based on the event;
a communication controlling step of establishing a connection with a communication terminal; and
an access controlling step of,
when the communication terminal is a registered terminal that is the communication terminal that has been registered in advance, allowing the registered terminal to access the normal recording data and the event recording data, and
when the communication terminal is an unregistered terminal that is the communication terminal that has not been registered in advance, not allowing the unregistered terminal to access the normal recording data and allowing the unregistered terminal to access the event recording data,
the connection with the communication terminal being established by the communication controlling step based on a connection request that is received after the event is detected by the event detecting step,
wherein, when a connection request is received from the unregistered terminal, the access controlling step permits the unregistered terminal to access the event recording data that is most recent data, and does not permit the unregistered terminal to access other event recording data that is not most recent data.

* * * * *